US012185393B2

(12) United States Patent
Abraham et al.

(10) Patent No.: US 12,185,393 B2
(45) Date of Patent: Dec. 31, 2024

(54) MULTICAST IDLE MODE BEHAVIOR AND PAGING

(71) Applicant: QUALCOMM Incorporated, San Diego, CA (US)

(72) Inventors: Santosh Paul Abraham, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/575,144

(22) Filed: Sep. 18, 2019

(65) Prior Publication Data

US 2020/0092923 A1 Mar. 19, 2020

Related U.S. Application Data

(60) Provisional application No. 62/733,534, filed on Sep. 19, 2018.

(51) Int. Cl.
*H04W 76/12* (2018.01)
*H04L 12/18* (2006.01)
(Continued)

(52) U.S. Cl.
CPC ........... *H04W 76/12* (2018.02); *H04L 12/189* (2013.01); *H04L 41/5003* (2013.01);
(Continued)

(58) Field of Classification Search
CPC ..... H04W 76/12; H04W 76/28; H04W 68/02; H04W 84/042; H04L 12/189; H04L 41/5003
(Continued)

(56) References Cited

U.S. PATENT DOCUMENTS 7,751,405 B1 7/2010 Kompella
8,072,977 B2 12/2011 Omar
(Continued)

FOREIGN PATENT DOCUMENTS

CN 101061653 A 10/2007
CN 101228708 A 7/2008
(Continued)

OTHER PUBLICATIONS

International Search Report and Written Opinion—PCT/US2019/051981—ISA/EPO—Mar. 24, 2020.
(Continued)

*Primary Examiner* — Xuan Lu
(74) *Attorney, Agent, or Firm* — Holland & Hart LLP

(57) ABSTRACT

Methods, systems, and devices for wireless communications are described. A user equipment (UE) may transmit a request to establish a multicast session. The request may identify a multicast service session including a multicast quality of service flow. The UE may receive, from a base station wirelessly communicating with the UE, an indication of communication resources for the UE to use to receive multicast packets of the multicast service session from a content provider via a tunnel between a first network node and the base station. The tunnel may be established for the multicast service session based on identifying that the multicast service session lacks an existing tunnel between the first network node and the base station. The UE may identify a discontinuous reception (DRX) cycle for the multicast service session, and receive the multicast packets from the base station according to the indicated communication resources and the identified DRX cycle.

32 Claims, 21 Drawing Sheets

(51) Int. Cl.
*H04L 41/5003* (2022.01)
*H04W 36/00* (2009.01)
*H04W 52/02* (2009.01)
*H04W 68/02* (2009.01)
*H04W 74/02* (2009.01)
*H04W 76/28* (2018.01)
*H04W 76/40* (2018.01)
*H04W 84/04* (2009.01)

(52) U.S. Cl.
CPC ........... *H04W 68/02* (2013.01); *H04W 76/28* (2018.02); *H04W 36/0011* (2013.01); *H04W 84/042* (2013.01)

(58) Field of Classification Search
USPC ......................................................... 370/312
See application file for complete search history.

(56) References Cited

U.S. PATENT DOCUMENTS

| | | | |
|---|---|---|---|
| 8,331,365 B2 | 12/2012 | Rey et al. | |
| 9,277,440 B2 | 3/2016 | Koc et al. | |
| 2008/0259865 A1* | 10/2008 | Hurtta | H04L 47/801 370/329 |
| 2009/0010195 A1* | 1/2009 | Gonsa | H04L 65/4076 370/312 |
| 2009/0149164 A1 | 6/2009 | Cai | |
| 2009/0201878 A1 | 8/2009 | Kotecha et al. | |
| 2009/0305712 A1* | 12/2009 | Franceschini | H04W 52/327 455/450 |
| 2015/0288733 A1* | 10/2015 | Mao | H04L 65/602 709/219 |
| 2015/0319472 A1* | 11/2015 | Kotecha | H04N 21/6131 725/62 |
| 2016/0050544 A1 | 2/2016 | Chandramouli et al. | |
| 2016/0119762 A1* | 4/2016 | Zhu | H04W 4/10 370/312 |
| 2016/0142898 A1 | 5/2016 | Poitau et al. | |
| 2018/0054388 A1 | 2/2018 | Herrero | |
| 2018/0160436 A1* | 6/2018 | Park | H04W 76/14 |
| 2019/0223250 A1* | 7/2019 | Dao | H04L 67/62 |
| 2019/0254013 A1* | 8/2019 | Chang | H04L 5/00 |
| 2019/0364541 A1* | 11/2019 | Ryu | H04W 80/10 |
| 2020/0045753 A1* | 2/2020 | Dao | H04W 48/16 |
| 2020/0059761 A1* | 2/2020 | Li | H04W 12/06 |
| 2020/0092780 A1* | 3/2020 | Koshimizu | H04W 36/36 |
| 2020/0267513 A1* | 8/2020 | Zhu | H04L 12/185 |
| 2020/0275302 A1* | 8/2020 | Youn | H04W 28/0268 |
| 2021/0022063 A1* | 1/2021 | Yang | H04W 72/12 |
| 2021/0076166 A1* | 3/2021 | Navratil | H04L 67/141 |
| 2021/0168751 A1 | 6/2021 | Stojanovski et al. | |

FOREIGN PATENT DOCUMENTS

| | | | | |
|---|---|---|---|---|
| CN | 107276904 A | | 10/2017 | |
| EP | 1077539 A1 | | 2/2001 | |
| WO | WO-2014069982 A1 | | 5/2014 | |
| WO | WO-2017120476 A1 * | | 7/2017 | ........... H04L 12/189 |

OTHER PUBLICATIONS

European Search Report—EP24191503—Search Authority—Munich—Sep. 25, 2024.
Liang J-M., et al., "Two-Phase Multicast DRX Scheduling for 3GPP LTE-Advanced Networks", IEEE Transaction on Mobile Computing, IEEE Service Center, Los Alamitos, CA, US, vol. 15, No. 7, Jul. 2016, pp. 1839-1849, XP011613455, the whole document.

* cited by examiner

MULTICAST IDLE MODE BEHAVIOR AND PAGING

CROSS REFERENCE

The present Application for Patent claims the benefit of U.S. Provisional Patent Application No. 62/733,534 by ABRAHAM, et al., entitled "MULTICAST IDLE MODE BEHAVIOR AND PAGING," filed Sep. 19, 2018, assigned to the assignee hereof, and expressly incorporated by reference herein.

BACKGROUND

The present disclosure generally relates to wireless communications, and more specifically to multicast idle mode behavior and paging.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support multicast idle mode behavior and paging. Some wireless communications systems may support broadcast and multicast services, however these wireless communications systems provide unnecessary complexity for supporting broadcast and multicast services. The described techniques herein relate to improved methods, systems, devices, and apparatuses that may mitigate these issues by supporting a network deployment that separates transport from services, and provides multimedia broadcast and multicast services based on service requirements (e.g., quality of service (QoS) flows) for the multimedia broadcast and multicast services.

A method for wireless communications at a user equipment (UE). The method may include transmitting a request to establish a multicast session, the request identifying a multicast service session comprising at least one multicast quality of service flow, receiving, from a base station wirelessly communicating with the UE, an indication of one or more of an activation of the at least one multicast quality of service flow or communication resources for the UE to use to receive multicast packets of the multicast service session from a content provider via a tunnel between a first network node and the base station, the tunnel established for the multicast service session in response to the transmitted request from the UE based on identifying that the multicast service session lacks an existing tunnel between the first network node and the base station, identifying a discontinuous reception (DRX) cycle for the multicast service session, and receiving information for the at least one multicast quality of service flow, the multicast packets carrying downlink data from the base station according to the indicated communication resources and the identified DRX cycle.

An apparatus for wireless communications is described. The apparatus may include a processor, memory coupled with the processor, and instructions stored in the memory. The instructions may be executable by the processor to cause the apparatus to transmit a request to establish a multicast session, the request identifying a multicast service session comprising at least one multicast quality of service flow, receive, from a base station wirelessly communicating with the apparatus, an indication of one or more of an activation of the at least one multicast quality of service flow or communication resources for the apparatus to use to receive multicast packets of the multicast service session from a content provider via a tunnel between a first network node and the base station, the tunnel established for the multicast service session in response to the transmitted request from the apparatus based on identifying that the multicast service session lacks an existing tunnel between the first network node and the base station, identify a DRX cycle for the multicast service session, and receive information for the at least one multicast quality of service flow, the multicast packets carrying downlink data from the base station according to the indicated communication resources and the identified DRX cycle.

Another apparatus for wireless communications is described. The apparatus may include means for transmitting a request to establish a multicast session, the request identifying a multicast service session comprising at least one multicast quality of service flow, means for receiving, from a base station wirelessly communicating with the apparatus, an indication of one or more of an activation of the at least one multicast quality of service flow or communication resources for the apparatus to use to receive multicast packets of the multicast service session from a content provider via a tunnel between a first network node and the base station, the tunnel established for the multicast service session in response to the transmitted request from the apparatus based on identifying that the multicast service session lacks an existing tunnel between the first network node and the base station, means for identifying a DRX cycle for the multicast service session, and means for receiving information for the at least one multicast quality of service flow, the multicast packets carrying downlink data from the base station according to the indicated communication resources and the identified DRX cycle.

A non-transitory computer-readable medium storing code for wireless communications at a UE is described. The code may include instructions executable by a processor to transmit a request to establish a multicast session, the request identifying a multicast service session comprising at least one multicast quality of service flow, receive, from a base station wirelessly communicating with the UE, an indication of one or more of an activation of the at least one multicast quality of service flow or communication resources for the UE to use to receive multicast packets of the multicast service session from a content provider via a tunnel between a first network node and the base station, the tunnel established for the multicast service session in response to the transmitted request from the UE based on identifying that the multicast service session lacks an existing tunnel between the first network node and the base station, identify a DRX cycle for the multicast service session, and receive information for the at least one multicast quality of service flow, the multicast packets carrying downlink data from the base station according to the indicated communication resources and the identified DRX cycle.

In some examples of the method, apparatuses, and non-transitory computer-readable medium described herein, the request identifying the multicast service session comprises a quality of service flow identifier.

In some examples of the method, apparatuses, and non-transitory computer-readable medium described herein, the quality of service flow identifier is unique within a service area.

In some examples of the method, apparatuses, and non-transitory computer-readable medium described herein, the first network node comprises a multicast user plane function (M-UPF).

Some examples of the method, apparatuses, and non-transitory computer-readable medium described herein may further include operations, features, means, or instructions for transitioning between a sleep state and an awake state to receive information for the at least one multicast quality of service flow, the multicast packets carrying downlink data from the base station according to the identified DRX cycle.

Some examples of the method, apparatuses, and non-transitory computer-readable medium described herein may further include operations, features, means, or instructions for transitioning between a sleep state and an awake state according to a second DRX cycle for the UE to receive multicast packets of a second multicast service session.

Some examples of the method, apparatuses, and non-transitory computer-readable medium described herein may further include operations, features, means, or instructions for transitioning between a sleep state and an awake state according to a second DRX cycle for the UE to receive unicast transmissions from the base station.

In some examples of the method, apparatuses, and non-transitory computer-readable medium described herein, the request identifying the multicast service session comprises a multicast packet data unit (M-PDU) session identifier.

In some examples of the method, apparatuses, and non-transitory computer-readable medium described herein, the M-PDU session identifier comprises a combination of a multicast session management function (M-SMF) identifier and a multicast stream identifier generated by the M-SMF.

In some examples of the method, apparatuses, and non-transitory computer-readable medium described herein, a quality of service flow identifier is unique to a public land mobile network (PLMN) associated with the base station.

In some examples of the method, apparatuses, and non-transitory computer-readable medium described herein, the M-PDU session identifier is generated by a second network node.

In some examples of the method, apparatuses, and non-transitory computer-readable medium described herein, receiving the quality of service flow identifier from the second network node, where the quality of service flow identifier is generated by the second network node.

In some examples of the method, apparatuses, and non-transitory computer-readable medium described herein, the request identifying the multicast service session comprises a data network name (DNN).

In some examples of the method, apparatuses, and non-transitory computer-readable medium described herein, the request identifying the multicast service session comprises network slice information.

In some examples of the method, apparatuses, and non-transitory computer-readable medium described herein, the multicast service session comprises a plurality of multicast quality of service flows.

In some examples of the method, apparatuses, and non-transitory computer-readable medium described herein, the multicast service session comprises one tunnel between the first network node and the base station.

Another method for wireless communications at a first network node is described. The method may include receiving a request to establish a multicast session for UE via a base station wirelessly communicating with the UE, the request identifying a multicast service session comprising at least one multicast quality of service flow, identifying that the multicast service session lacks a tunnel from a second network node to the base station to transport multicast packets of the multicast service session from a content provider to the UE via the tunnel, and establishing the tunnel between the second network node and the base station in response to the received request from the UE.

Another apparatus for wireless communications at a base station is described. The apparatus may include a processor, memory coupled with the processor, and instructions stored in the memory. The instructions may be executable by the processor to cause the apparatus to receive a request to establish a multicast session for a UE via a base station wirelessly communicating with the UE, the request identifying a multicast service session comprising at least one multicast quality of service flow, identify that the multicast service session lacks a tunnel from a second apparatus to the base station to transport multicast packets of the multicast service session from a content provider to the UE via the tunnel, and establish the tunnel between the second apparatus and the base station in response to the received request from the UE.

Another apparatus for wireless communications is described. The apparatus may include means for receiving a request to establish a multicast session for a UE via a base station wirelessly communicating with the UE, the request identifying a multicast service session comprising at least one multicast quality of service flow, means for identifying that the multicast service session lacks a tunnel from a second apparatus to the base station to transport multicast packets of the multicast service session from a content provider to the UE via the tunnel, and means for establishing the tunnel between the second apparatus and the base station in response to the received request from the UE.

A non-transitory computer-readable medium storing code for wireless communications at a first network node is described. The code may include instructions executable by a processor to receive a request to establish a multicast session for UE via a base station wirelessly communicating with the UE, the request identifying a multicast service session comprising at least one multicast quality of service flow, identify that the multicast service session lacks a tunnel from a second network node to the base station to transport multicast packets of the multicast service session from a content provider to the UE via the tunnel, and establish the tunnel between the second network node and the base station in response to the received request from the UE.

In some examples of the method, apparatuses, and non-transitory computer-readable medium described herein, the first network node comprises an M-SMF and the second network node comprises an M-UPF.

Some examples of the method, apparatuses, and non-transitory computer-readable medium described herein for establishing the multicast session may further include operations, features, means, or instructions for transmitting, from the first network node to the second network node, a request for the second network node to set up the tunnel between the second network node and the base station.

Some examples of the method, apparatuses, and non-transitory computer-readable medium described herein may further include operations, features, means, or instructions for generating an identifier for the multicast service session, wherein the request identifying the multicast service session comprises the identifier generated by the first network node.

Some examples of the method, apparatuses, and non-transitory computer-readable medium described herein for generating the identifier for the multicast service session may further include operations, features, means, or instructions for combining an M-SMF identifier for the first network node and a multicast stream identifier generated by the M-SMF to generate the identifier for the multicast service session.

In some examples of the method, apparatuses, and non-transitory computer-readable medium described herein, the request identifying the multicast service session comprises a quality of service flow identifier.

In some examples of the method, apparatuses, and non-transitory computer-readable medium described herein, the quality of service flow identifier is unique within a service area.

In some examples of the method, apparatuses, and non-transitory computer-readable medium described herein, the quality of service flow identifier is unique to a PLMN associated with the base station.

In some examples of the method, apparatuses, and non-transitory computer-readable medium described herein, the identifier for the multicast service session comprises an M-PDU session identifier.

Some examples of the method, apparatuses, and non-transitory computer-readable medium described herein may further include operations, features, means, or instructions for receiving an indicator of a handover of the UE from the base station wirelessly communicating with the UE to a target base station, and modifying a context of the multicast session for the UE in response to the received indicator.

Some examples of the method, apparatuses, and non-transitory computer-readable medium described herein may further include operations, features, means, or instructions for identifying that the target base station is outside a multicast service area for the multicast service session, wherein modifying the context comprises rejecting a request to enroll the UE in the multicast session and tearing down the multicast session for the UE.

Some examples of the method, apparatuses, and non-transitory computer-readable medium described herein may further include operations, features, means, or instructions for identifying that the target base station is inside a multicast service area for the multicast service session, wherein modifying the context comprises enrolling the UE in the multicast session.

DETAILED DESCRIPTION

A network node in a wireless communications system may support broadcast and multicast services based on service requirements (e.g., quality of service (QoS) flows) for the multimedia broadcast and multicast service, while separating transport from the services. The network node may receive a request to establish a multicast session for a user equipment (UE) via a base station wirelessly communicating with the UE. In some examples, the network node may be a multicast session management function (M-SMF). The request may identify a multicast service session including at least one multicast quality of service (QoS) flow. The network node may identify that the multicast service session lacks a tunnel from a second network node to the base station to transport multicast packets of the multicast service session from a content provider to the UE, and establish the tunnel between the second network node and the base station in response to the received request from the UE. In some examples, the second network node may be a multicast user plane function (M-UPF).

The UE may receive, from a base station wirelessly communicating with the UE, an indication of one or more of an activation of the at least one multicast quality of service flow or communication resources for the UE to use to receive multicast packets of the multicast service session from a content provider via a tunnel between the network node and the base station, the tunnel established for the multicast service session in response to the transmitted request from the UE based on identifying that the multicast service session lacks an existing tunnel between the first network node and the base station the tunnel. In some cases, the UE may identify a discontinuous reception (DRX) cycle for the multicast service session, and receive information for the at least one multicast quality of service flow, the multicast packets carrying downlink data from the base station according to the indicated communication resources and the identified DRX cycle.

Aspects of the disclosure are initially described in the context of a wireless communications system. Aspects of the disclosure are additionally or alternatively described in the context of a process flow. Aspects of the disclosure are additionally or alternatively illustrated by and described with reference to apparatus diagrams, system diagrams, and flowcharts that relate to multicast idle mode behavior and paging.

Figure 1:
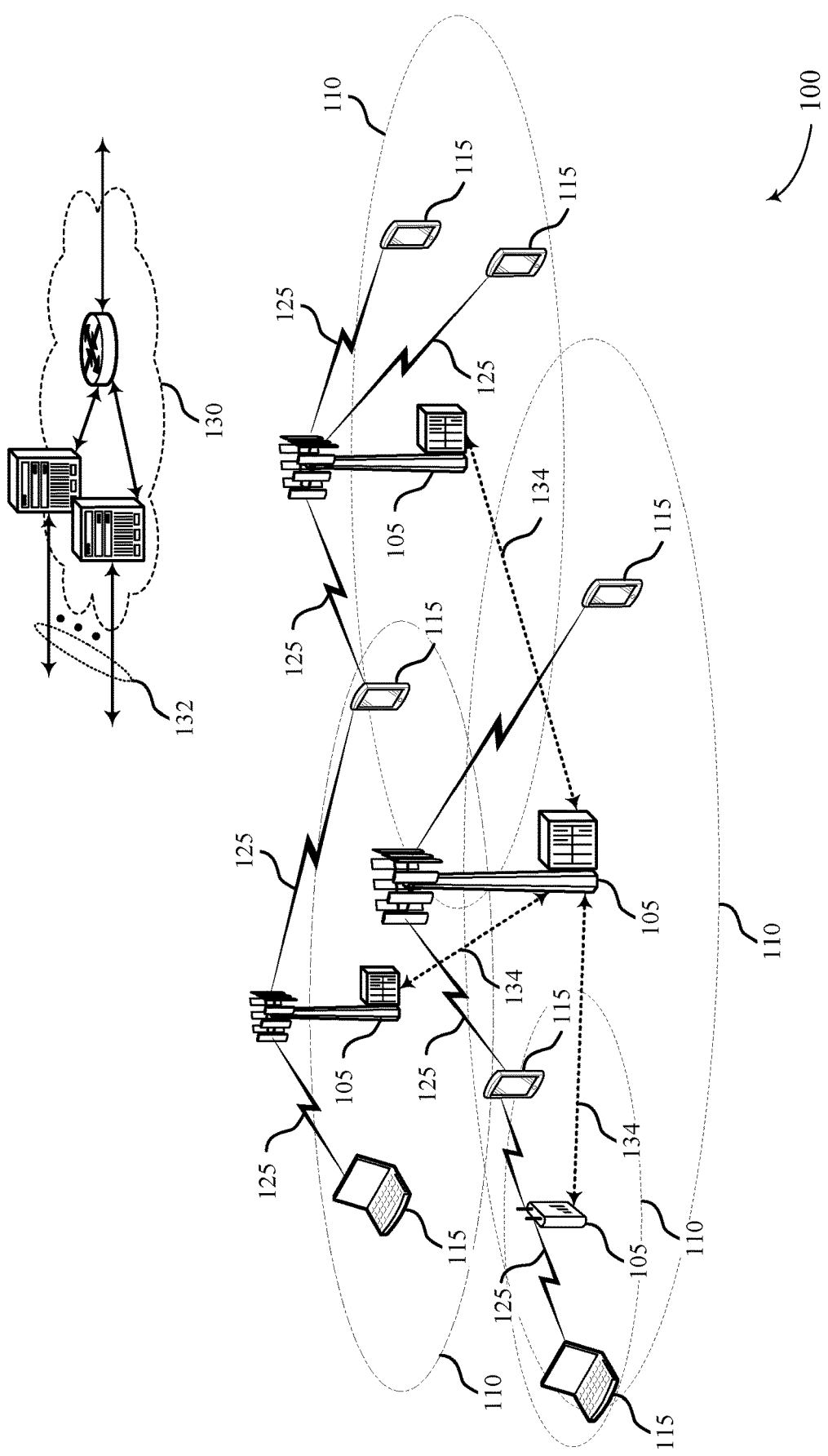
FIGS. 1 through 4 illustrate examples of a system for wireless communications that supports multicast idle mode behavior and paging in accordance with aspects of the present disclosure.

FIG. 1 illustrates an example of a wireless communications system 100 that supports multicast idle mode behavior and paging in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may additionally or alternatively be called forward link transmissions while uplink transmissions may additionally or alternatively be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may additionally or alternatively be referred to as a mobile device, a wireless device, a remote device, a handheld device, or a subscriber device, or some other suitable terminology, where the "device" may additionally or alternatively be referred to as a unit, a station, a terminal, or a client. A UE 115 may additionally or alternatively be a personal electronic device such as a cellular phone, a personal digital assistant (PDA), a tablet computer, a laptop computer, or a personal computer. In some examples, a UE 115 may additionally or alternatively refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may additionally or alternatively be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network (AN) entity, which may be an example of an access node controller (ANC). Each AN entity may communicate with UEs 115 through a number of other AN transmission entities, which may be referred to as a radio head, a smart radio head, or a transmission/reception point (TRP). In some examples, various functions of each AN entity or base station 105 may be distributed across various network devices (e.g., radio heads and AN controllers) or consolidated into a single network device (e.g., a base station 105).

Wireless communications system 100 may operate using one or more frequency bands, such as in the range of 300 MHz to 300 GHz. For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may additionally or alternatively operate in a super high frequency (SHF) region using frequency bands from 3 GHz to 30 GHz, additionally or alternatively known as the centimeter band. The SHF region includes bands such as the 5 GHz industrial, scientific, and medical (ISM) bands, which may be used opportunistically by devices that can tolerate interference from other users.

Wireless communications system 100 may additionally or alternatively operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may additionally or alternatively be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be additionally or alternatively divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may additionally or alternatively be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may additionally or alternatively include dedicated acquisition signaling (e.g., synchronization signals or system information, etc.) and control signaling that coordinates operation for the carrier. In some examples (e.g., in a carrier aggregation configuration), a carrier may additionally or alternatively have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may additionally or alternatively increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may additionally or alternatively be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may support broadcast and multicast services, however these wireless communications systems provide unnecessary complexity for supporting broadcast and multicast services. For example, 4G LTE network deployments for multimedia broadcast and multicast services are largely based on supporting TV-related subscription services. Other services such as IoT, software updates, and the like may be more complex to be realized as a multimedia broadcast and multicast service using existing network deployments. The wireless communications system 100 may mitigate these issues by supporting a network deployment that separates transport from services, specifies transport using a fifth generation (5G) core network functions, and provides multimedia broadcast and multicast services using the appropriate 5G core network service based on service requirements. Each multicast 5G core network service may provide a service layer functionality and APIs for external applications to use. The service layer may additionally or alternatively configure the multicast transport by setting up QoS flows for the multimedia broadcast and multicast services.

Figure 2:
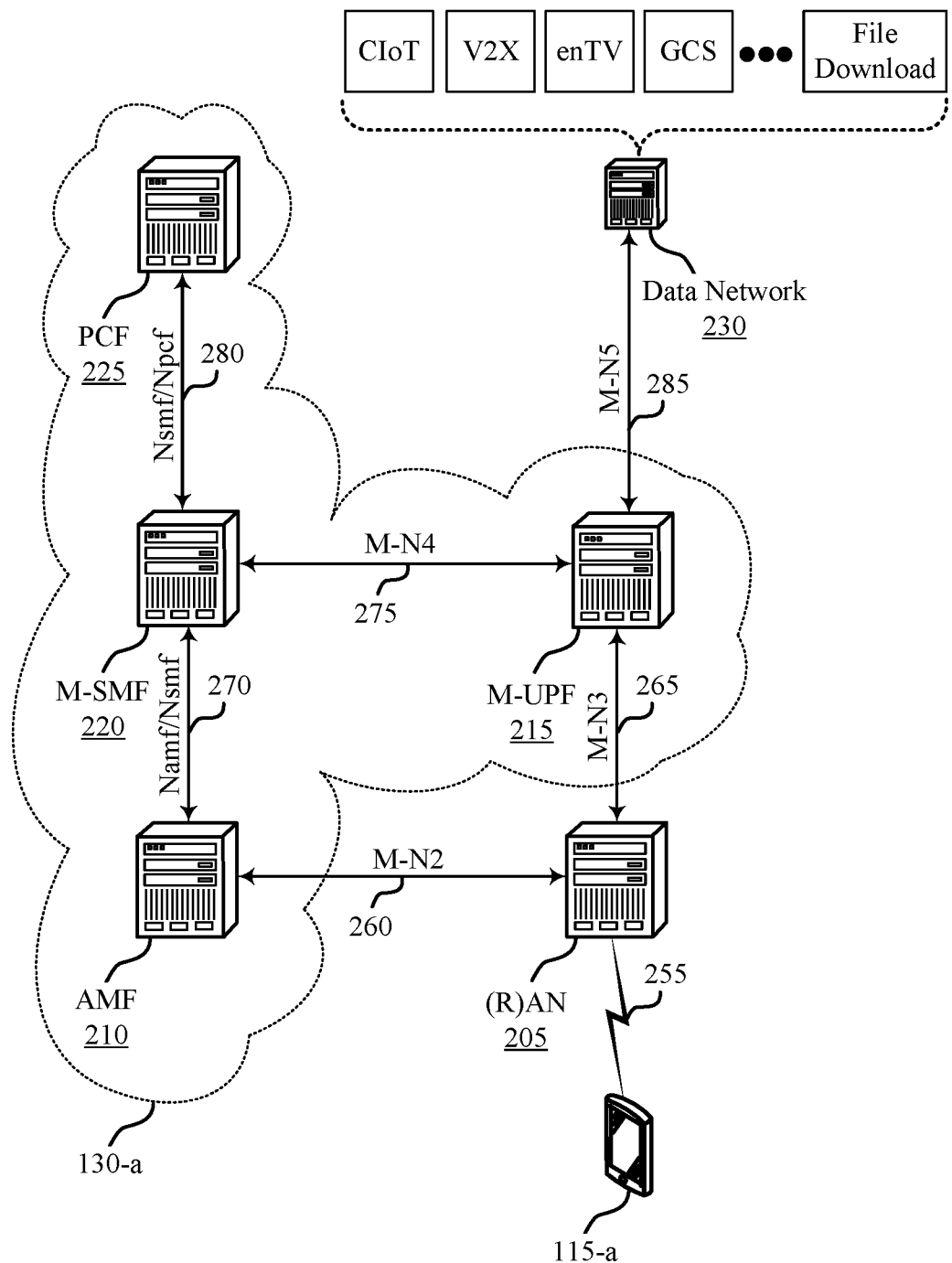

FIG. 2 illustrates a wireless communications system 200 that supports multicast idle mode behavior and paging in accordance with aspects of the present disclosure. In some examples, the wireless communications system 200 may support multimedia broadcast and multicast services available to any end-user, as well as multimedia broadcast and multicast services that are available to end-users having a subscription to a multicast group. The wireless communications system 200 may provide an enhanced approach for supporting multimedia broadcast and multicast services in a new radio network environment. For example, the wireless communications system 200 may configure a new system identification number to support these multimedia broadcast and multicast services (e.g., ad-hoc multicast and broadcast streams, software delivery over wireless connections, group communications, as well as broadcast and multicast IoT applications, V2X applications (e.g., vehicle-to-vehicle (V2V), vehicle-to-pedestrian (V2P), and vehicle-to-infrastructure (V2I)), public safety) for 5G new radio core networks. In some cases, the wireless communications system 200 may modularize multimedia broadcast and multicast services functionality to support both transport mode and full-service mode efficiently and effectively. Additionally, the wireless communications system 200 may support a service-based interface among the modularized multimedia broadcast and multicast service functionalities. In some cases, the wireless communications system 200 may support a flexible network deployment (e.g., distributed vs. centralized) and operation (e.g., control plane and user plane separation).

The wireless communications system 200 may implement aspects of the wireless communications system 100. For example, the wireless communications system 200 may include a UE 115-*a*, which may be examples of one or more corresponding devices described in FIG. 1. The wireless communications system 200 may additionally or alternatively include a (R)AN 205 (also referred to as a radio access network (RAN) or an AN), an access and mobility management function (AMF) 210, an M-UPF 215, an M-SMF 220, a point coordination function (PCF) 225, and a data network 230, which may be examples of one or more corresponding devices described in FIG. 1. The functions or devices (e.g., the AMF 210, the M-UPF 215, the M-SMF 220, the PCF 225) may be part of a core network, such as core network 130-*a*, which may be examples of the core network as described in FIG. 1.

The functions or devices (e.g., the UE 115-*a*, the (R)AN 205, the AMF 210, the M-UPF 215, the M-SMF 220, the PCF 225, and the data network 230) may communicate with each other via communication links (e.g., wireless or wired connections), which may include uplink transmissions and/or downlink transmissions to and/or from the functions or devices shown. For example, the UE 115-*a* and the (R)AN 205 may communicate with each other via communication link 255 which may include uplink transmissions and/or downlink transmissions. The (R)AN 205 and the AMF 210 may additionally or alternatively communicate with each other via communication link 260, which may be an M-N2 communication link for uplink transmissions and/or downlink transmissions. Additionally, or alternatively, the (R)AN 205 and the M-UPF 215 may communicate with each other via communication link 265, which may be an M-N3 communication link for uplink transmissions and/or downlink transmissions.

In some cases, the AMF 210 and the M-SMF 220 may communicate with each other via communication link 270, which may be an Namf/Nsmf communication link for uplink transmissions and/or downlink transmissions. The M-SMF 220 and the M-UPF 215 may communicate with each other via communication link 275, which may be an M-N4 communication link for uplink transmissions and/or downlink transmissions. Additionally, or alternatively, the M-SMF 220 and the PCF 225 may communicate with each other via communication link 280, which may be an Nsmf/Npcf communication link for uplink transmissions and/or downlink transmissions. The M-UPF 215 and the data network 230 may communicate with each other via communication link 285, which may be an M-N5 communication link for uplink transmissions and/or downlink transmissions.

The UE 115-*a* may support a multimedia broadcast and multicast service application, such as radio broadcasting, live streaming video services, software delivery, emergency alerts, etc. In some cases, a multicast service session for a multicast service application supported by the UE 115-*a* may have a predetermined QoS flow. That is, for one or more multicast streams directed to the UE 115-*a* predetermined QoS flows may be realized for these multicast streams. A QoS flow for a particular multicast stream may have different levels of granularity. For example, a QoS flow may have one priority for one type of traffic (e.g., live streaming video services) and another priority (e.g., higher or lower) for another type of traffic (e.g., emergency alerts). The functions (e.g., the AMF 210, the M-UPF 215, the M-SMF 220, the PCF 225) in the wireless communications system 200 may facilitate a QoS flow for a particular multicast stream requested by the UE 115-*a*.

The UE 115-*a* may establish a session, such as a multicast-protocol data unit (M-PDU) session, with the data network 230 for a multicast service application. The M-PDU session may provide an M-PDU connectivity service, which may support communicating M-PDUs between the UE 115-*a* and the data network 230. Although one data network 230 is shown, in some cases, the UE 115-*a* may access multiple data networks concurrently and have multiple protocol data unit (PDU) and/or M-PDU sessions. As part of establishing the multicast session, the UE 115-*a* and the data network 230 may perform a registration management procedure to setup or release a signaling relation between the UE 115-*a* and the data network 230. For instance, the UE 115-*a* may register with the data network 230 to receive predetermined services (e.g., multicast services requiring registration), enable mobility tracking, or enable reachability within the data network 230.

In some cases, the UE 115-*a* may initiate a periodic registration, where the UE 115-*a* may undergo the periodic registration with each expiration of a registration timer or following a predetermined time period of UE inactivity. The UE 115-*a* may maintain reachability within the data network 230 using the periodic registration. For example, the UE 115-*a* may move into a new tracking area within the data network 230. In this example, the UE 115-*a* may initiate a mobility registration based on moving into the new tracking area. The data network 230 may track the location of the UE 115-*a* and maintain reachability by registering the UE 115-*a* in the new tracking area.

Before establishing the session with the data network 230, the UE 115-*a* may provide predetermined information to the (R)AN 205 (e.g., which may be examples of a base station 105 described in FIG. 1) that may lead to the session establishment. For example, the UE 115-*a* may provide information such as resource requirements for a requested service, a priority of the requested service, among other information, which the (R)AN 205 may use to select an appropriate data network, such as data network 230 that may support the requested service (e.g., multicast service). For example, the data network 230 may support services such as, but not limited to, CIoT, V2X, enTV, GCS, file download, among others. As part of facilitating the session establishment between the UE 115-*a* and the data network 230, the (R)AN 205 may select an appropriate access management function, such as the AMF 210.

The (R)AN 205 may transmit the provided information to the selected AMF 210. Additionally, or alternatively, the (R)AN 205 may transmit additional information, such as location information, cell identity, radio access technology type, etc. to the selected AMF 210 along with the information provided by the UE 115-*a*. The selected AMF 210 may perform various procedures based on policies, protocols, or the received information. For example, the AMF 210 may support termination of non-access stratum (NAS) signaling, NAS ciphering and integrity protection, registration management, connection management, mobility management, access authentication and authorization, security context, among others.

As part of the session establishment, the AMF 210 may select an appropriate session management function (SMF) for authentication and security functionality. The UE 115-*a* may access a multicast session by setting up a M-PDU session using the AMF 210 that may be configured for the multicast stream. In some examples, the multicast session may have an M-PDU session identifier for the data network 230 (e.g., unique to a public land mobile network (PLMN)). An M-PDU session identifier related to a specific multicast session may be assigned by an M-SMF such as the M-SMF 220. In some cases, one M-SMF may be used for a multicast session. The M-PDU session identifier may be a combination of an M-SMF identifier and a multicast stream identifier generated by an M-SMF, such as the M-SMF 220. The identifier may be discoverable to the UE 115-*a* and one or more other UEs. For example, the UE 115-*a* may obtain an overview of the M-PDU session set up, as part of the discovery of the multicast service session and the identifier.

In some cases, as part of the session establishment, the UE 115-*a* may provide the M-PDU session identifier in the information (e.g., in a protocol data unit session request) for which it may request to enroll in. For example, the AMF 210 may select the M-SMF 220 based on the provided M-PDU session identifier, and forward some or all of the information provided by the UE 115-*a* to the M-SMF 220. As such, the UE 115-*a* may provide an identifier of a multicast session corresponding to a multicast QoS flow of a multicast service session, which the AMF 210 may use to select the M-SMF 220. The M-SMF 220 may record a UE-specific identifier associated with the UE 115-*a* that joins an M-PDU session with a M-PDU session identifier. The M-SMF 220 may support session establishment, modification, release, UE 115-*a* IP address allocation & management, termination of NAS signaling related to session management, downlink data notification, traffic steering configuration for the M-UPF 215 for proper traffic routing.

Figure 3:
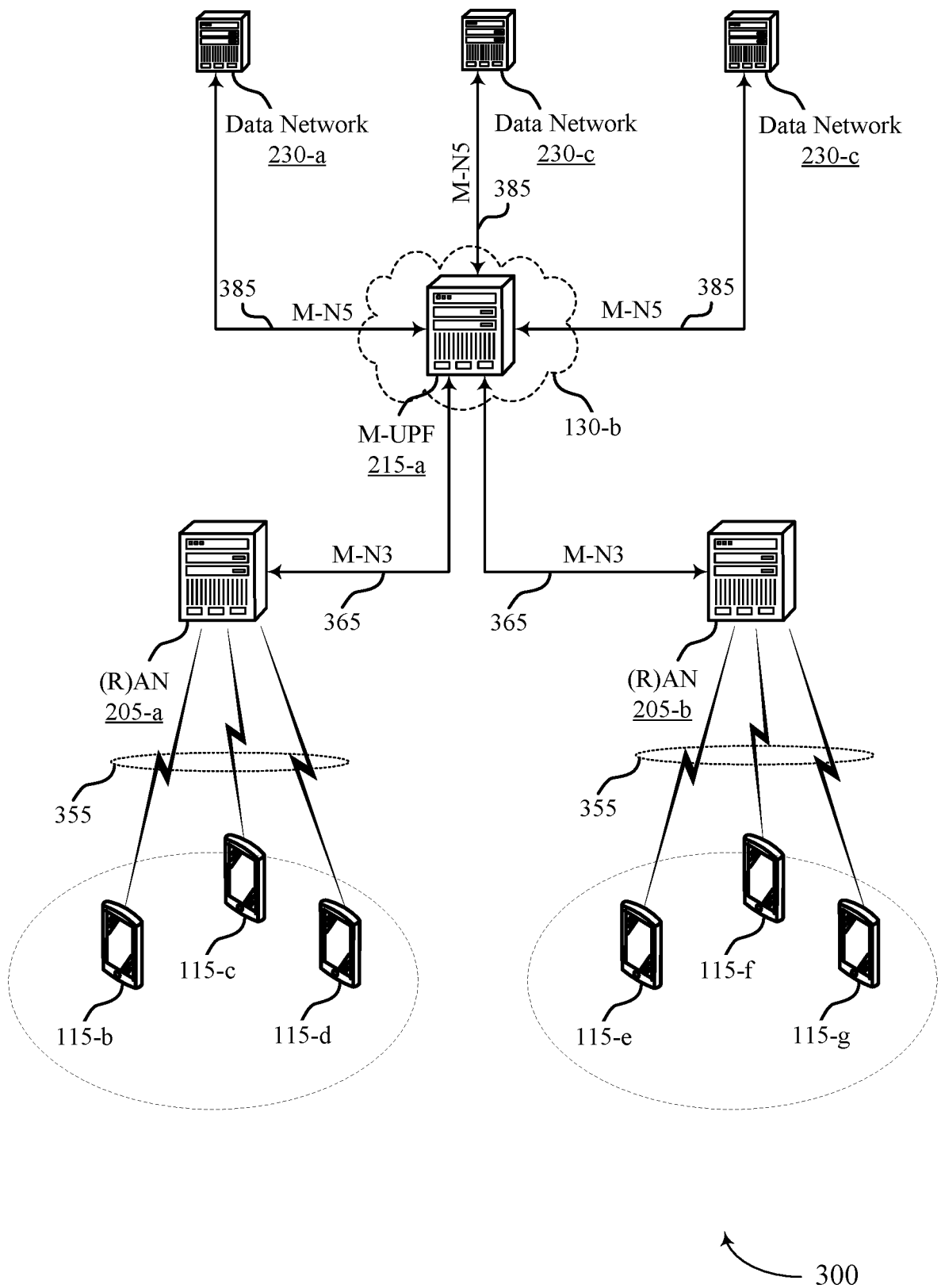

FIG. 3 illustrates a wireless communications system 300 that support multicast idle mode behavior and paging in accordance with aspects of the present disclosure. In some examples, the wireless communications system 300 may support delivery of multicast data. The wireless communications system 300 may implement aspects of the wireless communications system 200. For example, the wireless communications system 300 may include UEs 115-*b* through 115-*g*, which may be examples of one or more corresponding devices described in FIG. 2. The wireless communications system 300 may additionally or alternatively include a (R)AN 205-*a* and a (R)AN 205-*b*, an M-UPF 215-*a*, and data networks 230-*a* through 230-*c*, which may be examples of one or more corresponding devices described in FIG. 2.

The functions or devices (e.g., the UEs 115-*b* through 115-*g*, the (R)AN 205-*a*, the (R)AN 205-*b*, the M-UPF 215-*a*, and the data networks 230-*a* through 230-*c*) may communicate with each other via communication links (e.g., wireless or wired connections), which may include uplink transmissions and/or downlink transmissions to and/or from the functions or devices shown. For example, the UEs 115-*a* through 115-*d* and the (R)AN 205-*a* may communicate with each other via communication links 355 which may include uplink transmissions and/or downlink transmissions, and the UEs 115-*e* through 115-*g* and the (R)AN 205-*b* may communicate with each other via communication links 355 which may additionally or alternatively include uplink transmissions and/or downlink transmissions. The M-UPF 215-*a*, the (R)AN 205-*a*, and the (R)AN 205-*b* may communicate with each other via communication links 365, which may be M-N3 communication links for uplink transmissions and/or downlink transmissions. The M-UPF 215-*a* and the data networks 230-*a* through 230-*c* may communicate with each other via communication links 385, which may M-N5 communication links for uplink transmissions and/or downlink transmissions.

The M-UPF 215-a may be part of a core network, such as core network 130-b, which may be examples of the core network as described in FIG. 1. The M-UPF 215-a may contain user plane function functionality augmented with multicast capability. For example, the M-UPF 215-a may additionally or alternatively support packet routing and forwarding, packet inspection, QoS flow handling, acts as external protocol data unit session point of interconnect to the data networks 230-a through 230-c, and functions as an anchor point for intra-radio access technology mobility and inter-radio access technology mobility. With reference to FIG. 2, in some examples, the M-SMF 220 may signal to the M-UPF 215 to set up a tunnel to the (R)AN 205 for the UE 115-a, if a tunnel is not present. The tunnel may be a direct tunnel between the (R)AN 205 and the UE 115-a that may improve user experience, for example, expedite web page delivery, reduces round trip delay for conversational services by eliminating switching latency from the user plane.

Returning to FIG. 3, the M-UPF 215-a may set up one multicast core network tunnel per multicast service session to each (R)AN 205 that has one or more UEs 115 enrolled in the session. For example, the M-UPF 215-a may set up a first multicast core network tunnel per multicast service session for the (R)AN 205-a and a second multicast core network tunnel per multicast service session for the (R)AN 205-b. In some cases, the M-UPF 215-a may communicate multicast streams to multiple (R)ANs (e.g., the (R)AN 205-a and the (R)AN 205-b) that may service other UEs using multicast general packet radio service (GPRS) tunneling (GTP). The GTP tunnels may encapsulate user data when passing through a core network and additionally or alternatively carry bearer-specific signaling traffic between various core network entities (e.g., the AMF 210, the M-UPF 215, the M-SMF 220, the PCF 225).

In some cases, there may be separate GTP tunnels for user plane and control plane. For example, a GTP tunnel for a user plane may be used to carry user datagram traffic according to a user data protocol, which may be a transport protocol. In another example, a GTP tunnel for a control plane may be used for core network specific signaling (e.g., bearer activation, bearer deletion, bearer modification) according to a user datagram protocol, which may be a transport protocol. In some cases, these tunnels may be set up for (R)ANs, such as the (R)AN 205 that have at least one UE (e.g., the UE 115-a) receiving a multicast stream.

Returning to FIG. 2, in some examples, each multicast service session may contain one or more QoS flows. As such, the M-UPF 215 may set up bears according to the QoS flows associated with each multicast service session. In some cases, the (R)AN 205 may map the QoS flow in the multicast service session to either a multicast radio bearer or one or more unicast radio bearers. As such, the (R)AN 205 may determine to switch from multicast to unicast radio bearers based on a number of UEs that are subscribed to the multicast service session and radio conditions. For example, if the (R)AN 205 is servicing the UE 115-a, it may establish and use a unicast radio bearer. Otherwise, the (R)AN 205 may establish and use multicast radio bearers.

Figure 4:
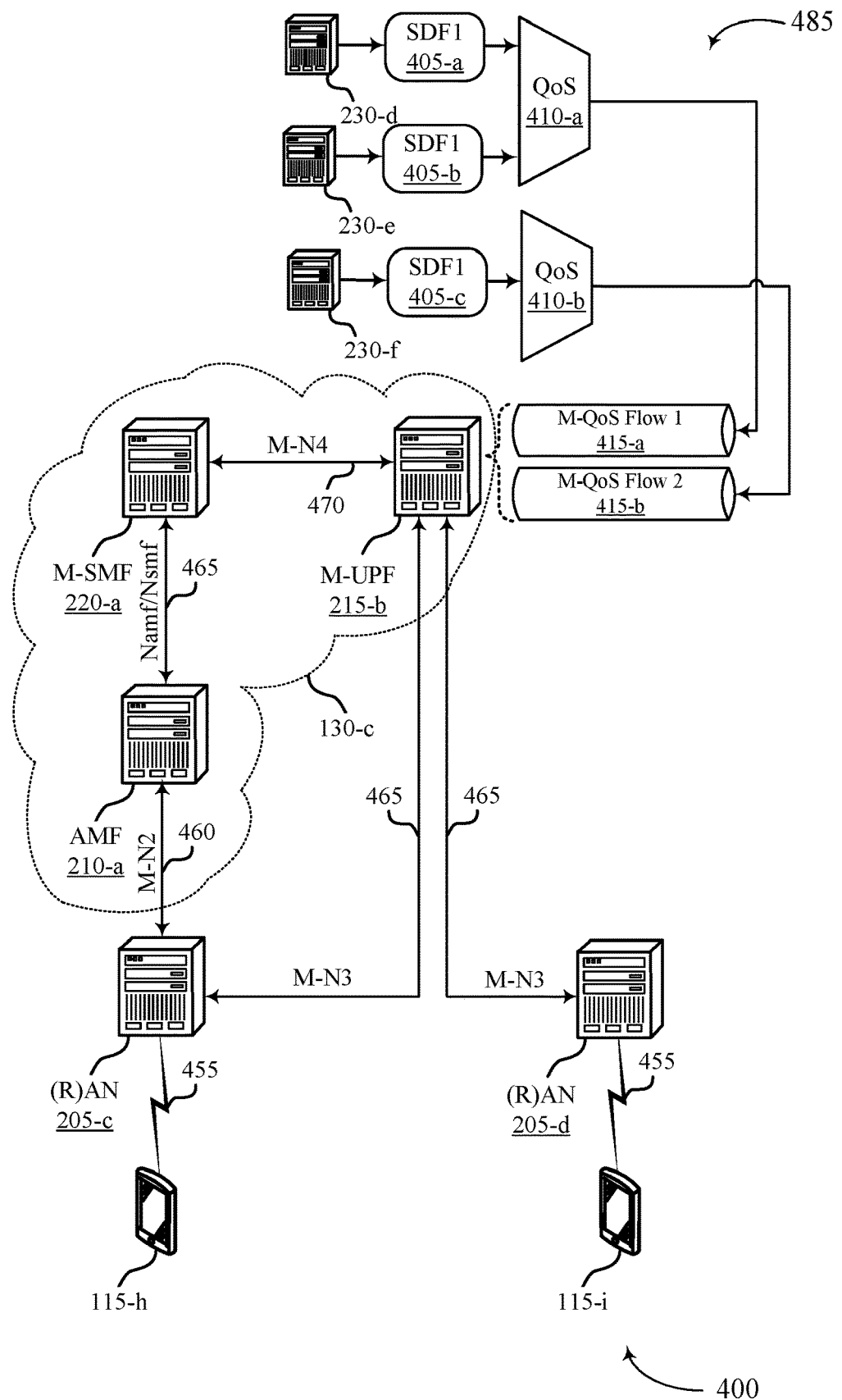

FIG. 4 illustrates a wireless communications system 400 that support multicast idle mode behavior and paging in accordance with aspects of the present disclosure. In some examples, the wireless communications system 400 may implement aspects of the wireless communications systems 100 through 300. For example, the wireless communications system 400 may include UEs 115-h and 115-i, which may be examples of one or more corresponding devices described in FIGS. 1 through 3. The wireless communications system 400 may additionally or alternatively include (R)ANs 205-c and 205-d, an AMF 210-a, an M-UPF 215-a, an M-SMF 220-a, and a plurality of data networks 230-a through 230-c, which may be examples of one or more corresponding functions or devices described in FIGS. 1 through 3. The functions (e.g., the AMF 210-a, the M-UPF 215-b, the M-SMF 220-a) may be part of a core network, such as core network 130-c, which may be examples of the core network as described in FIG. 1.

The functions or devices (e.g., the UEs 115-h and 115-i, the (R)ANs 205-c and 205-d, the AMF 210-a, the M-UPF 215-b, the M-SMF 220-a, and the data networks 230-d through 230-f) may communicate with each other via communication links (e.g., wireless or wired connections), which may include uplink transmissions and/or downlink transmissions to and/or from the functions or devices shown. For example, the UE 115-h and the (R)AN 205-c may communicate with each other via communication link 455 which may include uplink transmissions and/or downlink transmissions, and the UE 115-i and the (R)AN 205-d may additionally or alternatively communicate with each other via communication link 455 which may include uplink transmissions and/or downlink transmissions. In some cases, both the (R)AN 205-c and the (R)AN 205-d may communicate with the M-UPF 215-b via communication links 465, which may be M-N3 communication links for uplink transmissions and/or downlink transmissions.

In some cases, the (R)AN 205-c and the AMF 210-a may communicate with each other via communication link 460, which may be an M-N2 communication link for uplink transmissions and/or downlink transmissions. The AMF 210-a and the M-SMF 220-a may communicate with each other via communication link 465, which may be an Namf/Nsmf communication link for uplink transmissions and/or downlink transmissions. The M-SMF 220-a and the M-UPF 215-b may communicate with each other via communication link 470, which may be an M-N4 communication link for uplink transmissions and/or downlink transmissions. The M-UPF 215-b and the data networks 230-d through 230-f may communicate with each other via communication links 485, which may be M-N5 communication links for uplink transmissions and/or downlink transmissions.

By way of example, each data network 230-d through 230-f in FIG. 4 may support a multicast application, which may generate one or more multicast service data flows. For example, a multicast application supported by the data network 230-d may generate a service data flow 405-a, a multicast application supported by the data network 230-e may generate a service data flow 405-b, and a multicast application supported by the data network 230-f may generate a service data flow 405-c. Each service data flow may carry packets for a particular multicast service such as a streaming video application. In some examples, the service data flows may be identified by a five-tuple template including, for example, a source address, a destination address, a source port, a destination port, and a protocol identifier.

In some cases, each service data flow may have a predetermined QoS. Therefore, each service data flow 405-a through 405-c may be multiplexed into a corresponding QoS flow. For example, the service data flows 405-a and 405-b may be multiplexed into QoS 410-a, while the service data flow 405-c may be multiplexed into QoS 410-b. In some examples, the service data flows 405-a and 405-b may be multiplexed into QoS 410-a because these data flows may be associated with a same type of multicast service (e.g., video streaming). Upon multiplexing the service data flows 405 into a corresponding QoS 410, the data flows may be forwarded (multiplexed) to a corresponding multicast-QoS flow 415 at the M-UPF 215-b. For example, the multicast-QoS flows 415-a and 415-b may be set up by the M-SMF 220-a at the M-UPF 215-b when the multicast application becomes available at the corresponding data network 230. In some cases, resources may be assigned at a time that a UE (e.g., the UE 115-h and/or the UE 115-i) requests access to a multicast application. The multicast-QoS flows 415 may not be torn down by a (R)AN 205 when the UE 115 leaves. Instead, the tear down may be performed semi-autonomously or autonomously by the M-SMF 220-a.

Returning to FIG. 3, a multicast group (e.g., a number of UEs 115) set up may originate at the M-UPF 215-a that may communicate multicast streams to multiple (R)ANs (e.g., the (R)ANs 205-a and 205-b) that are all part of the same multicast group. The M-UPF 215-a may communicate information with the UEs 115-b through 115-g and the (R)ANs 205-a and 205-b in the multicast group according to an internet group management protocol (IGMP), while communicating information with data networks 230 (e.g., service and content providers) using a protocol independent multicast (PIM), which may relate to a number of multicast routing protocols for internet protocol networks that provide one-to-many and many-to-many distribution of multicast streams.

With reference to FIG. 2, the AMF 210 may additionally or alternatively select a PCF 225 (e.g., based on the provided information by the UE 115-a), which may support unified policy framework, providing policy rules to control plane functions, access subscription information for policy decisions. For example, the UE 115-a may provide a subscriber permanent identifier, a temporary user identifier (e.g., an identifier of an access management function previously serving the UE 115-a), one or more security parameters, a protocol data unit session status, or any other identifiers related to the UE 115-a requesting registration in the data network 230. The AMF 210 may communicate this information to the PCF 225, which may apply operator policies for the UE 115-a in the data network 230. Following the exchange information between the UE 115-a, the (R)AN 205, the AMF 210, the M-UPF 215, the M-SMF 220, the PCF 225, and the data network 230, the UE 115-a may have an established multicast service session with the data network 230, where the multicast service session may support one or more multicast service applications having one or more QoS flows.

In some cases, the UE 115-a may move into a new tracking area within the data network 230. In this example, the UE 115-a may initiate a mobility registration based on moving into the new tracking area. The data network 230 may track the location of the UE 115-a and maintain reachability by registering the UE 115-a in the new tracking area. When the UE 115-a moves from a source (R)AN (e.g., the (R)AN 205) to a target (R)AN (e.g., another such as (R)AN 205-b shown in FIG. 3) when moving into a new tracking area, several factors may be evaluated when transferring a multicast service session that may be active for the UE 115-a. For example, predetermined multicast services may be restricted to a particular area, even if the target (R)AN belongs to a same data network (e.g., the data network 230). As such, an example factor may include determining whether the UE 115-a is in a service area of the multicast service session. Another factor may include determining whether the M-UPF 215 serving the active multicast service session is coupled with the target (R)AN. Additionally, or alternatively, another factor may include determining whether the target (R)AN already has UEs that are receiving the multicast service session. Also, another factor may include determining whether a reliability is needed (i.e., can the multicast service session tolerate loss of frames while switching from the source radio access network (SRAN) to the target RAN).

A multicast service session may be restricted to a subset of a registration area, which may be referred to herein as a multicast service area, of the UE 115-a. The multicast service area may include a number of tracking areas that the multicast service is available in. A tracking area may be a coverage area where the UE 115-a can roam around without having to change the AMF 210 and/or the M-SMF 220. As part of the session establishment, multicast service area information (e.g., an indication of a coverage area for the multicast service) may be provided to the UE 115-a and the AMF 210.

To support a multicast service area, the M-SMF 220 may subscribe mobility events for UEs including the UE 115-a that are enrolled in the multicast service session. The M-SMF 220 may additionally or alternatively ignore or reject requests from UEs to join the multicast service session when the UEs are out of the multicast service area. In some cases, if the UE 115-a moves out of a multicast service area, the M-SMF 220 may terminate the multicast session to the UE 115-a, and inform the M-UPF 215 that may additionally or alternatively terminate a respective N3 tunnel to the UE 115-a.

When the UE 115-a does roam out of a multicast service area, the AMF 210 may in some cases perform a handover procedure (e.g., Xe-based handover procedure) for the UE 115-a. For example, the AMF 210 may include a M-PDU session identifier along with the M-PDU PDU session in a handover command to a target (R)AN. In some cases, if the multicast session is already being served by the target (R)AN, information regarding the multicast session may be transmitted to the source (R)AN (e.g., (R)AN 205) and to the UE 115-a by the target (R)AN, so that the UE 115-a may discover the multicast stream from the target (R)AN. Alternatively, the AMF 210 may refrain from including the M-PDU session identifier along with the M-PDU session in the handover command to the target (R)AN. In some examples, the target (R)AN may reject the M-PDU session altogether, for example, if does not support the multicast service.

In some cases, the AMF 210 may include the M-PDU session identifier along with the M-PDU session in a message to a new AMF associated with the target (R)AN. Each data network (e.g., PLMN) may have one M-UPF associated with it that connects to the traffic source (e.g., multicast application). For example, data network 230 is associated with the M-UPF 215, which may be additionally or alternatively referred to as an anchor M-UPF. In some cases, there may be a change to the M-UPF 215. For instance, if the UE 115-a moves into a cell that is not served by the M-UPF 215, the M-UPF 215 may trigger an M-UPF associated with the cell to set up a tunnel between the UE 115-a and a (R)AN associated with the cell. The M-UPF 215 may then forward the traffic associated with the multicast service to the new M-UPF associated with the cell in which the UE 115-a now resides in, via an N9 tunnel.

According to the techniques described above, the wireless communications system 200 may mitigate issues related to existing wireless communications systems by supporting a network deployment that separates transport from services, specifies transport using 5G core network functions, and providing a multicast service using appropriate 5G core network functions based on service requirements. The techniques described herein may additionally or alternatively improve the reliability and efficiency of the wireless communications system 200. For example, valuable resources are prevented from being wasted by a (R)AN when no UEs are available to receive multicast traffic. Further, UEs may be in a connected mode for reception of the multicast traffic, thereby avoiding situations when the (R)AN may waste valuable resources (e.g., bandwidth, power). The techniques described herein may allow (R)ANs to switch between unicast and multicast to improve efficiency and reliability when servicing either a single UE or multiple UEs. In some cases, the wireless communications system 200 may support retransmission of multicast frames based on acknowledgement and non-acknowledgment feedback from UEs. The wireless communications system 200 may additionally or alternatively support usage-based charging for multicast services.

The techniques described herein may additionally or alternatively improve the reliability and efficiency of the wireless communications system 200 by allowing UEs to operation in DRX or enhanced DRX (eDRX) behavior. That is, UEs may be capable of switching into idle mode and waking up to get paged when multicast traffic is scheduled. To support this feature, each multicast session may have a DRX cycle of its own. This may allow each multicast sessions DRX cycle to be adapted to latency requirements of the multicast session. Therefore, according to the techniques described herein, the wireless communications system 200 may support multicast services in a new radio network deployment by enabling multicast transport in 5G core network, RAN to UE communications (e.g., handling reception of multicast service in idle mode, reliability of reception, enabling retransmissions), security of multicast service (e.g., encryption of multicast data traffic), and power saving features for the UE (e.g., DRX for UEs receiving multicast traffic)

Figure 5A:
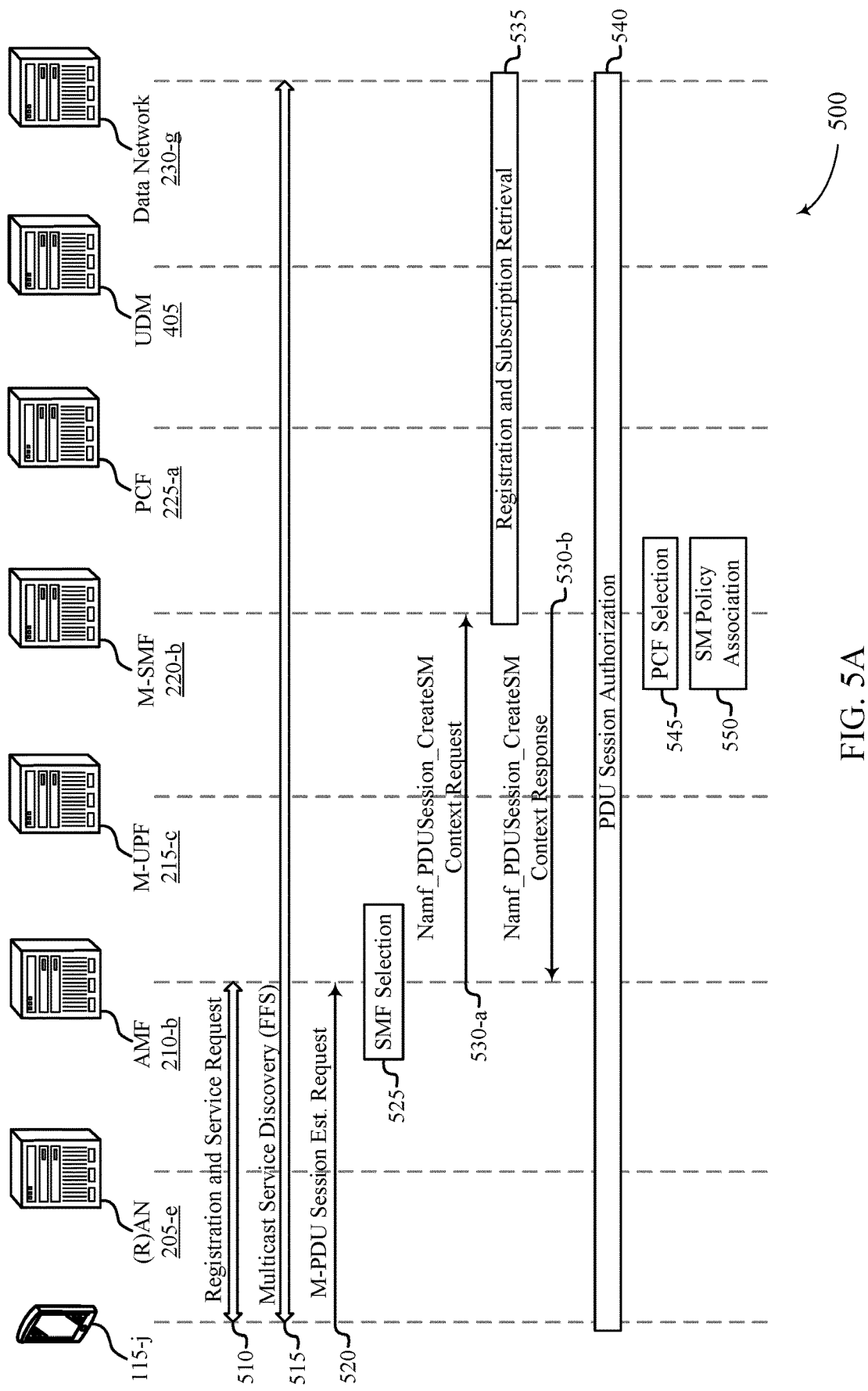
FIGS. 5A and 5B illustrate examples of a process flow that supports multicast idle mode behavior and paging in accordance with aspects of the present disclosure.
Figure 5B:
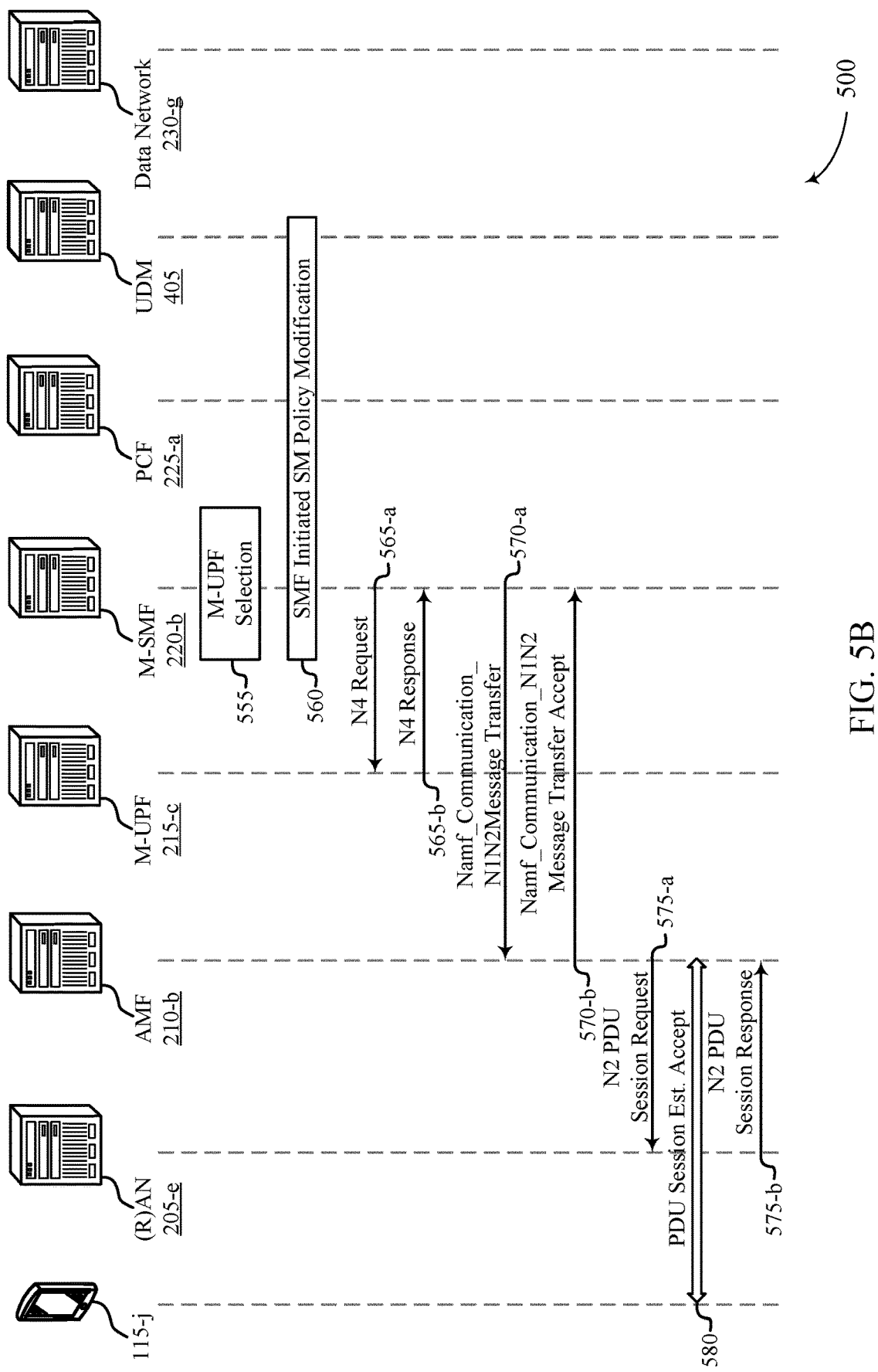

FIGS. 5A and 5B illustrates examples of process flow 500 that support multicast idle mode behavior and paging in accordance with aspects of the present disclosure. In some examples, the process flow 500 may implement aspects of the wireless communications systems 100 through 400. For example, UE 115-*j*, (R)AN 205-*e*, AMF 210-*b*, M-UPF 215-*c*, M-SMF 220-*b*, PCF 225-*a*, unified data management (UDM) 505, and data network 230-*g*, may be examples of the corresponding functions and devices described with reference to FIGS. 1 through 4.

In the following description of the process flow 500, the operations between the UE 115-*j*, the (R)AN 205-*e*, the AMF 210-*b*, the M-UPF 215-*c*, the M-SMF 220-*b*, the PCF 225-*a*, the UDM 505, and the data network 230-*g* may be transmitted in a different order than the exemplary order shown, or the operations performed by the UE 115-*j*, the (R)AN 205-*e*, the AMF 210-*b*, the M-UPF 215-*c*, the M-SMF 220-*b*, the PCF 225-*a*, the UDM 505, and the data network 230-*g* may be performed in different orders or at different times. Predetermined operations may additionally or alternatively be left out of the process flow 500, or other operations may be added to the process flow 500.

With reference to FIG. 5A, at 510 the UE 115-*j* transmit a registration and service request to the (R)AN 205-*e*, which may share information provided in the request with the AMF 210-*b*. For example, the UE 115-*j* may register indicating multicast capability to the (R)AN 205-*e*. The UE 115-*j* may additionally or alternatively request for network slices that support the multicast service the UE 115-*j* intends to obtain. At 515, the UE 115-*j* may perform a multicast service discovery. For example, the UE 115-*j* may discover the multicast service requested via a service advertisement server in the data network 230-*g* that it is coupled with.

At 520, the UE 115-*j* may transmit an M-PDU session establishment request to the AMF 210-*b*. For example, the UE 115-*j* may request to join a particular M-PDU session, which may be identified based on a M-PDU session identifier (e.g., provided by the UE 115-*j*). At 525, the AMF 210-*b* may select the M-SMF 220-*b*. For example, the AMF 210-*b* may select the M-SMF 220-*b* using the M-PDU session identifier provided by the UE 115-*j*. At 530-*a*, the AMF 210-*b* may transmit to the M-SMF 220-*b* a message (e.g., Namf_PDUSession_CreateSMContextRequest) requesting that the UE 115-*j* join the identified M-PDU session.

At 535, the M-SMF 220-*b* may retrieve registration information and subscription information associated with the UE 115-*j*, and determine whether the UE 115-*j* can join the identified M-PDU session offered by the data network 230-*g*. Based on the determination, at 530-*b* the M-SMF 220-*b* may transmit a response message (e.g., Namf_PDUSession_CreateSMContextResponse) to the AMF 210-*b* indicating that the UE 115-*j* is allowed to join the identified M-PDU session.

At 540, the UE 115-*j* may perform a secondary authentication with the data network 230-*g*. For example, once the UE 115-*j* is determined to be able to join the identified M-PDU session, the secondary authentication between the UE 115-*j* and the data network 230-*g* may be performed. At 545, the M-SMF 220-*b* may select the PCF 225-*a*, which may support unified policy framework, providing policy rules to control plane functions, access subscription information for policy decisions. At 550, M-SMF 220-*b* may perform session management policy establishment or session management function-initiated session management policy association modification.

In some cases, there may be multiple types of user plane functions for a multicast session. An example type may include an anchor M-UPF that may be preselected during configuration of the multicast application for the data network 230-*g* (e.g., PLMN) or when the UE 115-*j* for a multicast service area is being set up. Another example type may include a secondary M-UPF that may be used if the anchor M-UPF cannot serve an (R)AN that the UE 115-*j* is coupled with. With reference to FIG. 5B, at 555 the M-SMF 220-*b* may select an appropriate M-UPF 215-*c*. At 560, the M-SMF 220-*b* may perform SW-initiated session management policy modification.

At 565-*a*, the M-SMF 220-*b* may transmit an N4 request to the M-UPF 215-*c*, which may create or modify an N4 session towards the M-UPF 215-*c* (or a secondary multicast-user plane function) of the UE 115-*j* that has joined a multicast service area. The M-UPF 215-*c* may create charging records for the UE 115-*j* based on information received from the M-SMF 220-*b*. In some cases, an N4 session may be established for a multicast-protocol data unit session identifier to the M-UPF 215-*c*. In some examples, more than one UE (e.g., in addition to the UE 115-*j*) may be attached to the N4 session. At 565-*b*, the M-UPF 215-*c* may transmit an N4 response to the M-SW 220-*b*.

The following operations may be performed when the UE 115-*j* from the (R)AN 205-*e* sets up the M-PDU session for a multicast service session. The (R)AN 205-*e* may be informed of the air link resources and the core network tunnel(s) to create to the M-UPF 215-*c*. For example, at 570-*a* the M-SW 220-*b* may transmit a message (e.g., Namf_communication_N1N2MessageTransfer) to the AMF 210-*b*, which may at 570-*b* receive the message and transmit a reply message (e.g., Namf_communication_N1N2MessageTransfer Accept) to the M-SW 220-*b*. At 575-*a*, the AMF 210-*b* may transmit an N2 protocol data unit session request to the (R)AN 205-*e*. At 580, a PDU session establishment accept may be exchanged between the UE 115-*j*, the (R)AN 205-*e*, and the AMF 210-*b*. At 575-*b*, the (R)AN 205-*e* may transmit an N2 protocol data unit session response to the AMF 210-*b*.

Figure 6:
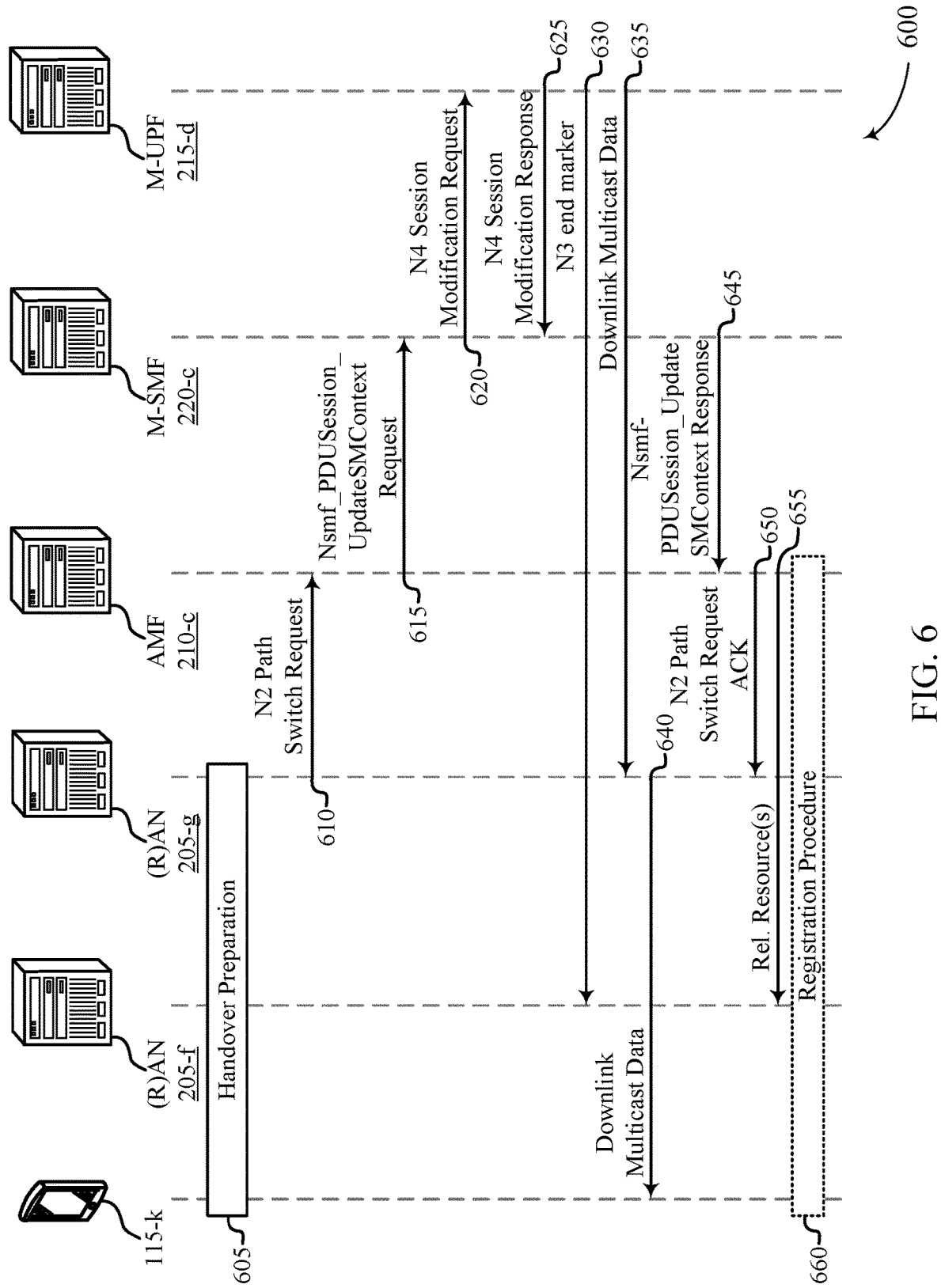
FIG. 6 illustrates an example of a process flow that supports multicast idle mode behavior and paging in accordance with aspects of the present disclosure.

FIG. 6 illustrates an examples of a process flow 600 that supports multicast idle mode behavior and paging in accordance with aspects of the present disclosure. The process flow 600 may support a handover without changing a multicast-user plane function. In some examples, the process flow 600 may implement aspects of the wireless communications systems 100 through 400. For example, UE 115-*k*, source (R)AN 205-*f*, target (R)AN 205-*g*, AMF 210-*c*, M-SW 220-*c*, and M-UPF 215-*d*, may be examples of the corresponding functions and devices described with reference to FIGS. 1 through 4.

In the following description of the process flow 600, the operations between the UE 115-*k*, the source (R)AN 205-*f*, the target (R)AN 205-*g*, the AMF 210-*c*, the M-SMF 220-*c*, and the M-UPF 215-*d* may be transmitted in a different order than the exemplary order shown, or the operations performed by the UE 115-*k*, the source (R)AN 205-*f*, the target (R)AN 205-*g*, the AMF 210-*c*, the M-SMF 220-*c*, and the M-UPF 215-*d* may be performed in different orders or at different times. Predetermined operations may additionally or alternatively be left out of the process flow 600, or other operations may be added to the process flow 600.

At 605, the UE 115-*k*, the source (R)AN 205-*f*, and the target (R)AN 205-*g* may perform a handover preparation. The handover preparation may include identifying the target (R)AN 205-*g* based on evaluating one or more factors for transferring a multicast service session that may be active for the UE 115-*k*. For example, predetermined multicast services may be restricted to a particular area, even if the target (R)AN 205-*g* belongs to a same data network. As such, an example factor may include determining whether the UE 115-*k* is in a service area of the multicast service session. Additionally, or alternatively, another factor may include determining whether the target (R)AN 205-*g* already has UEs that are receiving the multicast service session. Also, another factor may include determining whether a reliability is needed (i.e., can the multicast service session tolerate loss of frames while switching from the source (R)AN 205-*f* to the target (R)AN 205-*g*).

At 610, the target (R)AN 205-*g* may transmit a path switch request (e.g., N2 path switch request) to the AMF 210-*c*. The path switch request may include all the PDU sessions and M-PDU sessions that may be transferred to the target (R)AN 205-*g*. At 615, the AMF 210-*c* may forward information associated with the target (R)AN 205-*g* (e.g., an identifier of the target (R)AN 205-*g*) and the all the PDU sessions and M-PDU sessions information in a message (e.g., Nsmf_PDUSession_UpdateSMContext Request) to the M-SMF 220-*c*.

At 620, the M-SMF 220-*c* may transmit a message to the M-UPF 215-*d* to update tunneling to establish the target (R)AN 205-*g*, and terminate tunneling to the source (R)AN 205-*f*. For example, for M-PDU sessions, the M-SMF 220-*c* may update the M-UPF 215-*d* of the target (R)AN 205-*g*. That is, if there are core network tunnels serving a multicast service area to the target (R)AN 205-*g*, the M-SMF 220-*c* may update the UE 115-*k* information with the new core network tunnel information. Alternatively, if a new core network tunnel targets (R)AN 205-*g*, the M-UPF 215-*d* sets up a new tunnel to the target (R)AN 205-*g* and begins transmitting multicast frames to the target (R)AN 205-*g*.

At 625, the M-UPF 215-*d* may transmit a reply message to the M-SMF 220-*c*. For example, when there are no more UEs for a multicast service session at the source (R)AN 205-*f*, the M-UPF 215-*d* may terminate the core network tunnel for the multicast service session, and transmit a rely message to the M-SMF 220-*c* indicating the termination of the old core network tunnels and establishment of the new core network tunnels. At 630, the M-UPF 215-*d* may provide an N3 end marker to the source (R)AN 205-*f* indicating the termination of the previously-established core network tunnels. At 635, the M-UPF 215-*d* may transmit downlink multicast data (e.g., frames) to the target (R)AN 205-*g*, and at 640 the target (R)AN 205-*g* may forward the downlink multicast data to the UE 115-*k*.

At 645, the M-SMF 220-*c* may provide information of the transferred PDU and M-PDU sessions to the AMF 210-*c* in a message (e.g., Nsmf_PDUSession_UpdateSMContextResponse). At 650, the AMF 210-*c* may transmit a message (e.g., N2 path switch request acknowledgement) to the target (R)AN 205-*g*. At 655, the AMF 210-*c* may release resources allocated to the source (R)AN 205-*f*. At 660, the registration procedure may complete between the UE 115-*k*, the source (R)AN 205-*f*, the target (R)AN 205-*g*, and the AMF 210-*c*.

Figure 7A:
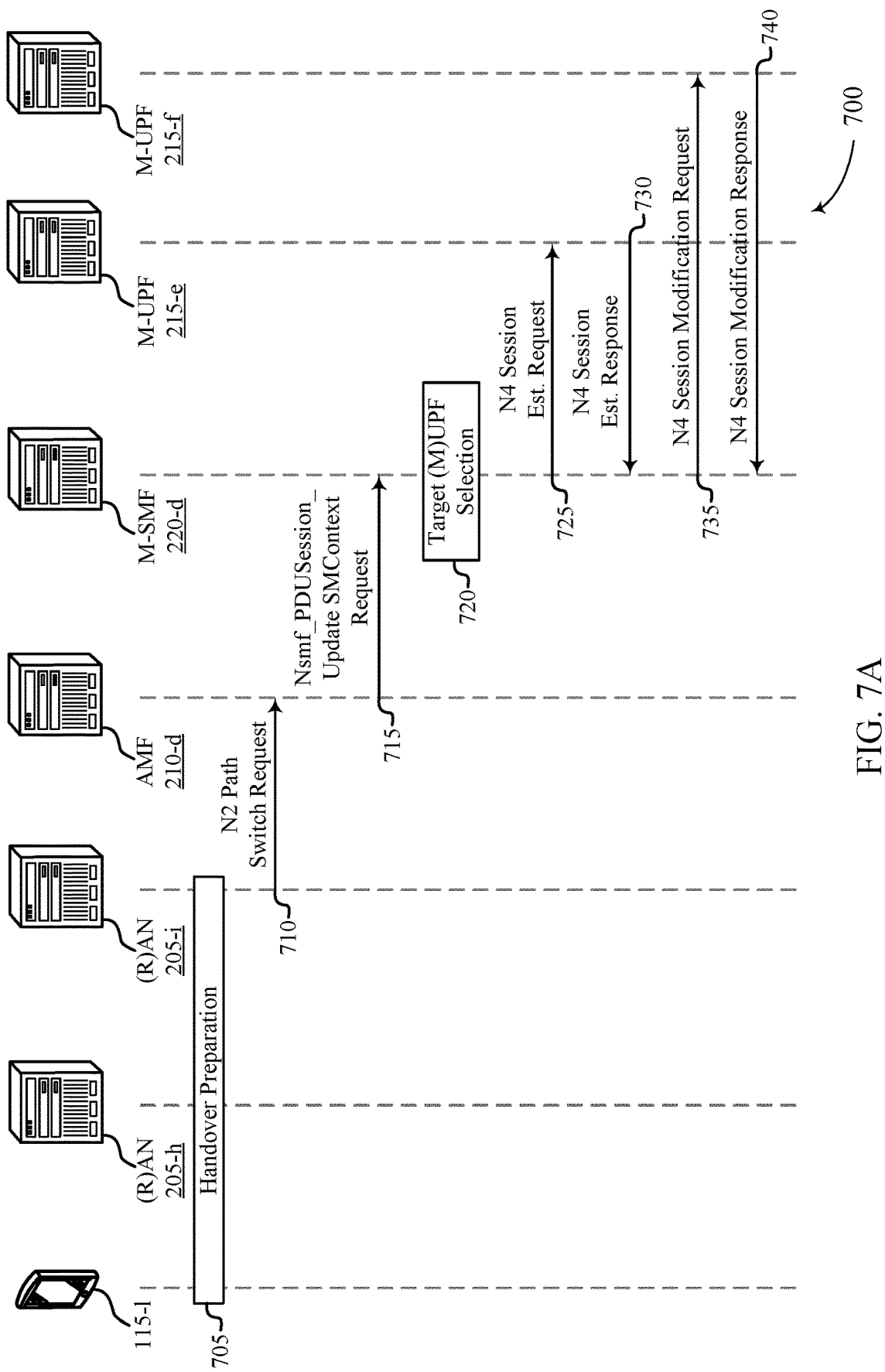
FIGS. 7A and 7B illustrate examples of a process flow that supports multicast idle mode behavior and paging in accordance with aspects of the present disclosure.
Figure 7B:
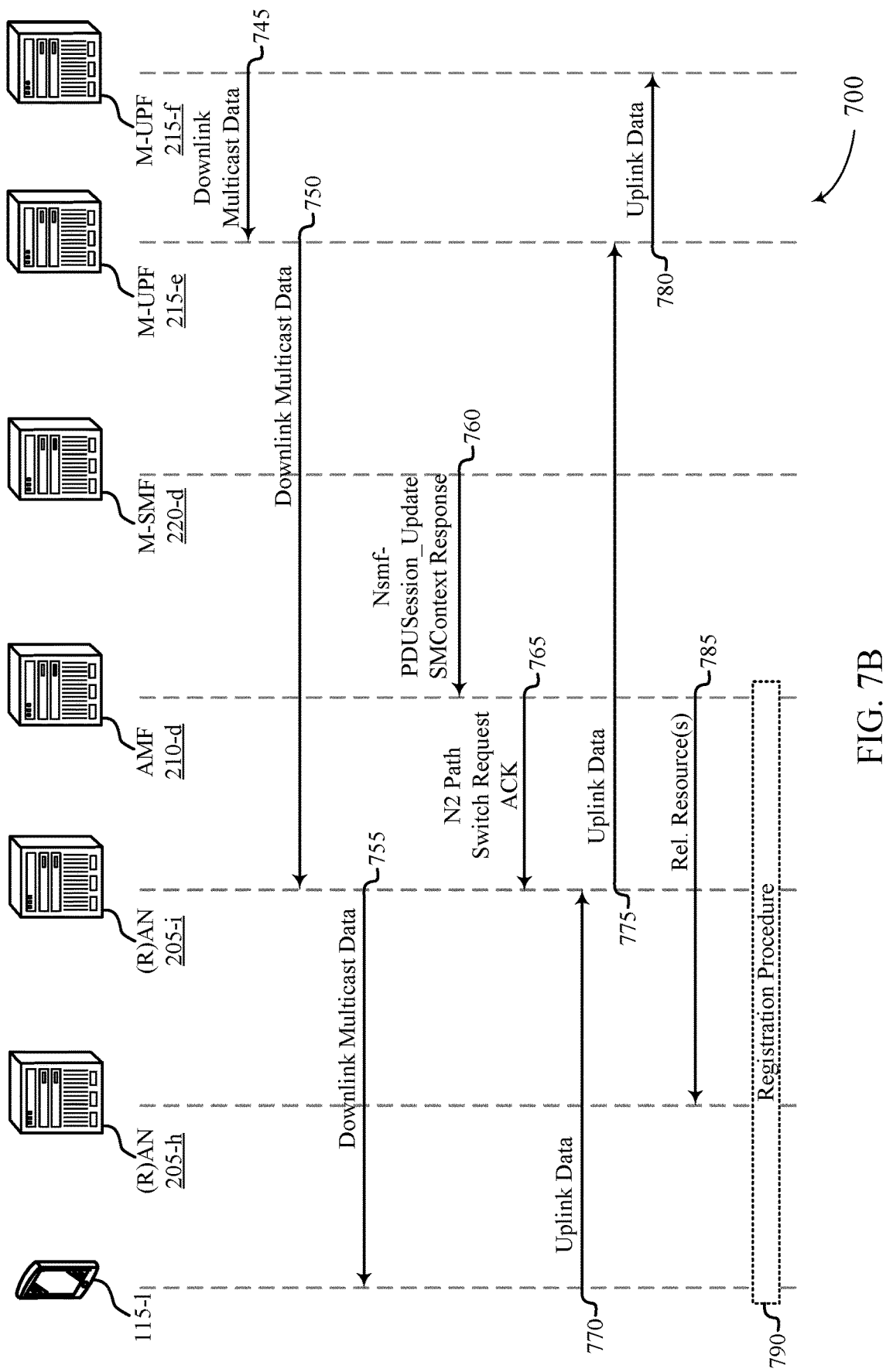

FIGS. 7A and 7B illustrates examples of process flow 700 that support multicast idle mode behavior and paging in accordance with aspects of the present disclosure. In some examples, the process flow 700 may implement aspects of the wireless communications systems 100 through 400. For example, UE 115-1, source (R)AN 205-*h*, target (R)AN 205-*i*, AMF 210-*d*, M-UPF 215-*e*, anchor M-UPF 215-*f*, and M-SMF 220-*d*, may be examples of the corresponding functions and devices described with reference to FIGS. 1 through 4.

In the following description of the process flow 700, the operations between the UE 115-1, the source (R)AN 205-*h*, the target (R)AN 205-*i*, the AMF 210-*d*, the M-UPF 215-*e*, the anchor M-UPF 215-*f*, and the M-SMF 220-*d* may be transmitted in a different order than the exemplary order shown, or the operations performed by the UE 115-1, the source (R)AN 205-*h*, the target (R)AN 205-*i*, the AMF 210-*d*, the M-UPF 215-*e*, the anchor M-UPF 215-*f*, and the M-SMF 220-*d* may be performed in different orders or at different times. Predetermined operations may additionally or alternatively be left out of the process flow 700, or other operations may be added to the process flow 700.

With reference to FIG. 7A, at 705 the UE 115-1, the source (R)AN 205-*h*, and the target (R)AN 205-*i* may perform a handover preparation. The handover preparation may include identifying the target (R)AN 205-*i* based on evaluating one or more factors for transferring a multicast service session that may be active for the UE 115-1. For example, predetermined multicast services may be restricted to a particular area, even if the target (R)AN 205-*i* belongs to a same data network. As such, an example factor may include determining whether the UE 115-*k* is in a service area of the multicast service session. Additionally, or alternatively, another factor may include determining whether the target (R)AN 205-*i* already has UEs that are receiving the multicast service session. Also, another factor may include determining whether a reliability is needed (i.e., can the multicast service session tolerate loss of frames while switching from the source (R)AN 205-*h* to the target (R)AN 205-*i*).

At 710, the target (R)AN 205-*i* may transmit a path switch request (e.g., N2 path switch request) to the AMF 210-*d*. The path switch request may include all the PDU sessions and M-PDU sessions that may be transferred to the target (R)AN 205-*i*. At 715, the AMF 210-*d* may forward information associated with the target (R)AN 205-*i* (e.g., an identifier of the target (R)AN 205-*i*) and the all the PDU sessions and M-PDU sessions information in a message (e.g., Nsmf_P-DUSession_UpdateSMContext Request) to the M-SMF 220-*d*. In some cases, the M-SMF 220-*d* may determine that an intermediary M-UPF is needed to serve the target (R)AN 205-*i*. At 720, the M-SMF 220-*d* may select the M-UPF 215-*e* as the intermediary M-UPF is needed to serve the target (R)AN 205-*i*.

At 725, the M-SMF 220-*d* may transmit an N4 session establishment request to the M-UPF 215-*e*, if the M-SMF 220-*d* does not have an N4 connection to the M-UPF 215-*e* for the multicast service session. At 730, the M-UPF 215-*e* may transmit an N4 session establishment response to the M-SMF 220-*d*. The M-SMF 220-*d* may update UE status at the anchor M-UPF 215-*f* and provide information associated with the M-UPF 215-*e* to the anchor M-UPF 215-*f*. For example, at 735 the M-SMF 220-*d* may transmit an N4 session modification request to the anchor M-UPF 215-*f* indicating that the M-UPF 215-*e* may be used for routing multicast traffic to the (R)AN 205-*i*. At 740, the anchor M-UPF 215-*f* may transmit an N4 session modification response to the M-SMF 220-*d*.

With reference to FIG. 7B, at 745 the anchor M-UPF 215-*f* may transmit downlink multicast data (e.g., M-PDU session frames) to the M-UPF 215-*e*. At 750, the M-UPF 215-*e* may transmit the downlink multicast data to the target (R)AN 205-*i*. At 755, the target (R)AN 205-*i* may transmit the downlink multicast data to the UE 115-1.

At 760, the M-SMF 220-*d* may provide information of the transferred PDU and M-PDU sessions to the AMF 210-*d* in a message (e.g., Nsmf_PDUSession_UpdateSMContext Response). At 765, the AMF 210-*d* may transmit a message (e.g., N2 path switch request acknowledgement) to the target (R)AN 205-*i*.

At 770, the UE 115-1 may transmit uplink data to the target (R)AN 205-*i*. At 775, the target (R)AN 205-*i* may forward the uplink data to the M-UPF 215-*e*. At 780, the M-UPF 215-*e* may forward the uplink data to the anchor M-UPF 215-*f*. At 785, the AMF 210-*d* may release resources allocated to the source (R)AN 205-*h*. At 790, the registration procedure may complete between the UE 115-1, the source (R)AN 205-*h*, the target (R)AN 205-*i*, and the AMF 210-*d*.

Figure 8:
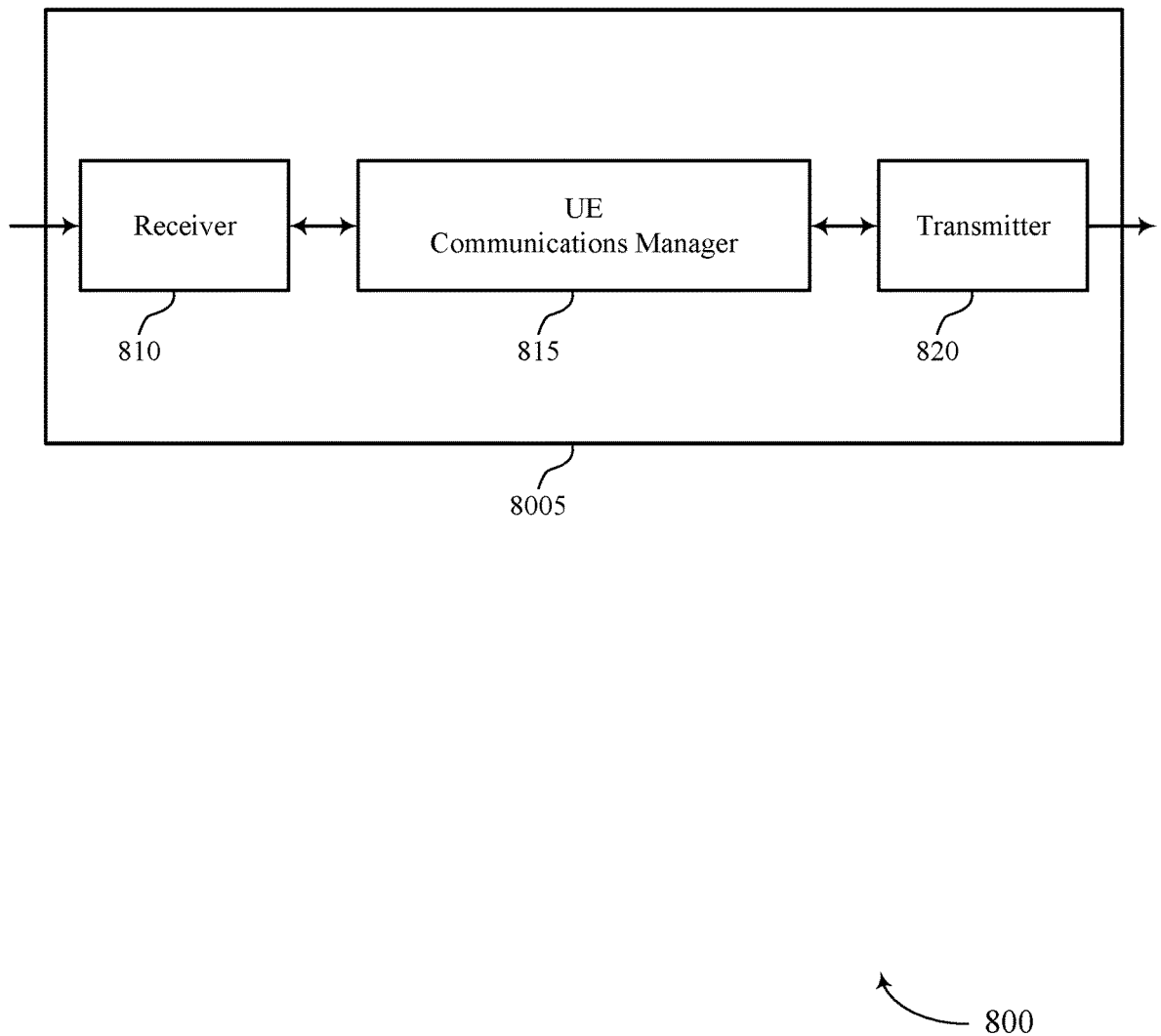
FIGS. 8 and 9 show block diagrams of devices that support multicast idle mode behavior and paging in accordance with aspects of the present disclosure.

FIG. 8 shows a block diagram 800 of a device 805 that supports multicast idle mode behavior and paging in accordance with aspects of the present disclosure. The device 805 may be an example of aspects of a UE 115 as described herein. The device 805 may include a receiver 810, a UE communications manager 815, and a transmitter 820. The device 805 may additionally or alternatively include a processor. Each of these components may be in communication with one another (e.g., via one or more buses).

The receiver 810 may receive information such as packets, user data, or control information associated with various information channels (e.g., control channels, data channels, and information related to multicast idle mode behavior and paging, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may transmit a request to establish a multicast session, the request identifying a multicast service session including at least one multicast quality of service flow, receive, from a base station wirelessly communicating with the device 805, an indication of one or more of an activation of the at least one multicast quality of service flow or communication resources for the device 805 to use to receive multicast packets of the multicast service session from a content provider via a tunnel between a first network node and the base station, the tunnel established for the multicast service session in response to the transmitted request from the device 805 based on identifying that the multicast service session lacks an existing tunnel between the first network node and the base station the tunnel, receive information for (e.g., related to) the at least one multicast quality of service flow, the multicast packets carrying downlink data from the base station according to the indicated communication resources and the identified DRX cycle, and identify a DRX cycle for the multicast service session. The UE communications manager 815 may be an example of aspects of the UE communications manager 1015 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1020 described with reference to FIG. 10. The transmitter 820 may utilize a single antenna or a set of antennas.

Figure 9:
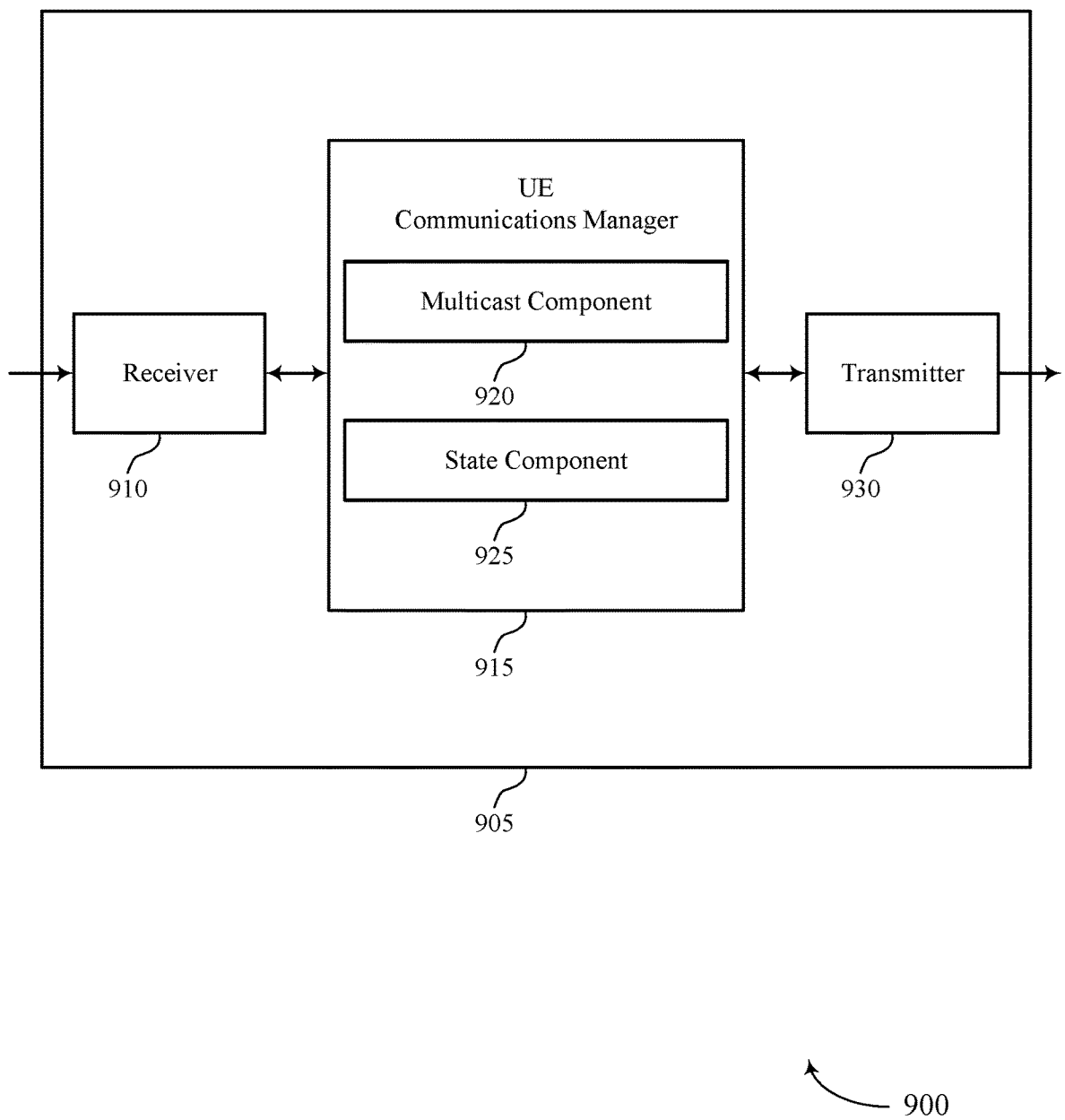

FIG. 9 shows a block diagram 900 of a device 905 that supports multicast idle mode behavior and paging in accordance with aspects of the present disclosure. The device 905 may be an example of aspects of a device 805, or a UE 115 as described herein. The device 905 may include a receiver 910, a UE communications manager 915, and a transmitter 935. The device 905 may additionally or alternatively include a processor. Each of these components may be in communication with one another (e.g., via one or more buses).

The receiver 910 may receive information such as packets, user data, or control information associated with various information channels (e.g., control channels, data channels, and information related to multicast idle mode behavior and paging, etc.). Information may be passed on to other components of the device 905. The receiver 910 may be an example of aspects of the transceiver 1020 described with reference to FIG. 10. The receiver 910 may utilize a single antenna or a set of antennas. The receiver 910 may receive, from a base station wirelessly communicating with the device 905, an indication of one or more of an activation of the at least one multicast quality of service flow or communication resources for the device 905 to use to receive multicast packets of the multicast service session from a content provider via a tunnel between a first network node and the base station, the tunnel established for the multicast service session in response to the transmitted request from the device 905 based on identifying that the multicast service session lacks an existing tunnel between the first network node and the base station. The receiver 910 may receive the information for the at least one multicast quality of service flow, the multicast packets carrying downlink data from the base station according to the indicated communication resources and the identified DRX cycle.

The UE communications manager 915 may be an example of aspects of the UE communications manager 815 as described herein. The UE communications manager 915 may include a multicast component 920 and a state component 925. The UE communications manager 915 may be an example of aspects of the UE communications manager 1015 described herein. The multicast component 920 may identify a DRX cycle for the multicast service session. The state component 925 may transition between a sleep state and an awake state to receive the information for the at least one multicast quality of service flow, the multicast packets carrying downlink data from the base station according to the identified DRX cycle. In some examples, the state component 925 may transition between a sleep state and an awake state according to a second DRX cycle for the device 905 to receive multicast packets of a second multicast service session. In some examples, the state component 925 may transition between a sleep state and an awake state according to a second DRX cycle for the device 905 to receive unicast transmissions from the base station.

The transmitter 935 may transmit signals generated by other components of the device 905. In some examples, the transmitter 935 may be collocated with a receiver 910 in a transceiver module. For example, the transmitter 935 may be an example of aspects of the transceiver 1020 described with reference to FIG. 10. The transmitter 935 may utilize a single antenna or a set of antennas. The transmitter 935 may transmit a request to establish a multicast session, the request identifying a multicast service session including at least one multicast quality of service flow.

Figure 10:
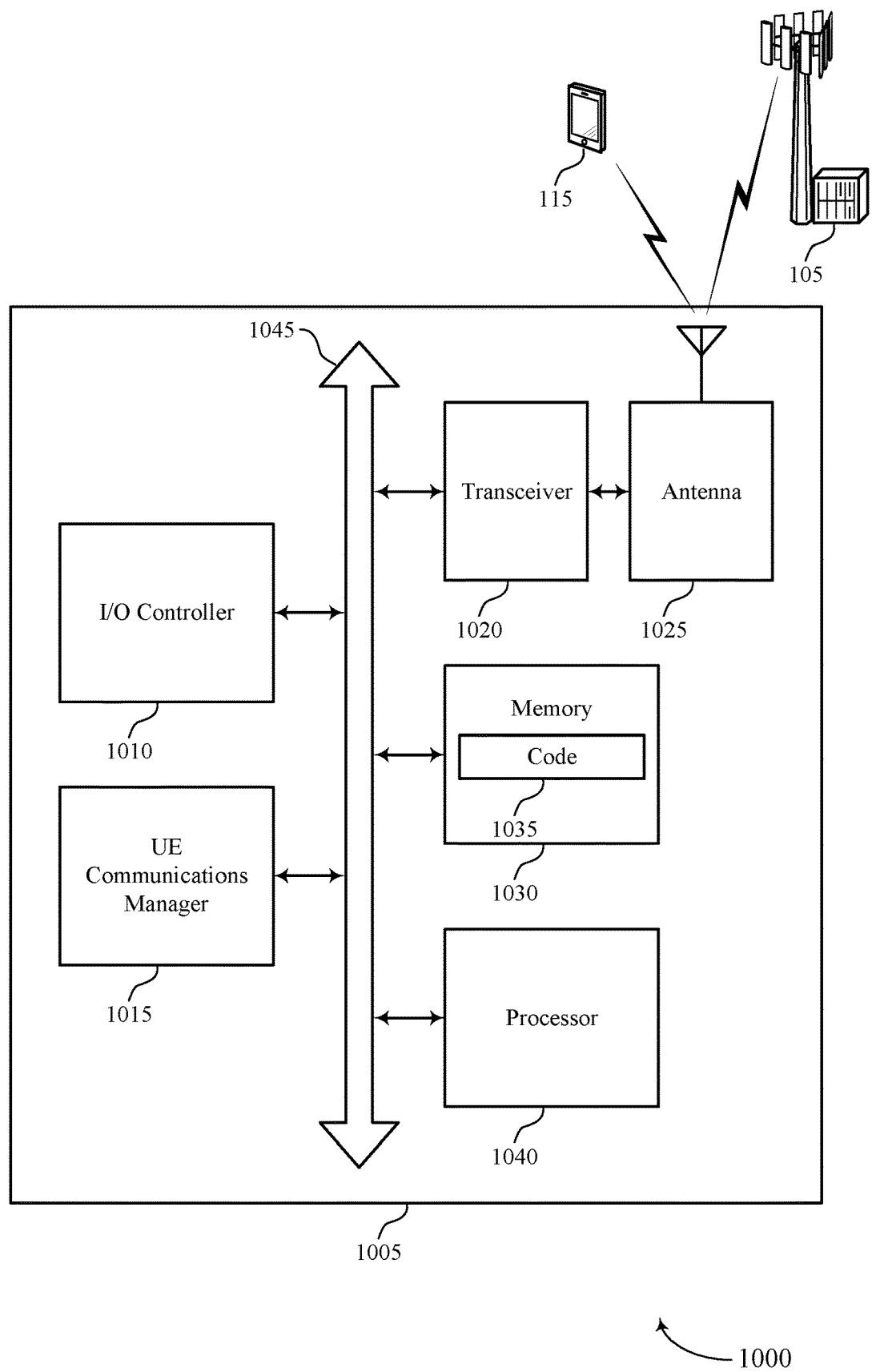
FIG. 10 shows a diagram of a system including a device that supports multicast idle mode behavior and paging in accordance with aspects of the present disclosure.

FIG. 10 shows a diagram of a system 1000 including a device 1005 that supports multicast idle mode behavior and paging in accordance with aspects of the present disclosure. The device 1005 may be an example of or include the components of device 805, device 905, or a UE 115 as described herein. The device 1005 may include components for bi-directional voice and data communications including components for transmitting and receiving communications, including an I/O controller 1010, a UE communications manager 1015, a transceiver 1020, an antenna 1025, memory 1030, and a processor 1040. These components may be coupled via one or more buses (e.g., bus 1045).

The I/O controller 1010 may manage input and output signals for the device 1005. The I/O controller 1010 may additionally or alternatively manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor. In some cases, a user may interact with the device 1005 via the I/O controller 1010 or via hardware components controlled by the I/O controller 1010.

The UE communications manager 1015 may transmit a request to establish a multicast session, the request identifying a multicast service session including at least one multicast quality of service flow, receive, from a base station wirelessly communicating with the device 1005, an indication of one or more of an activation of the at least one multicast quality of service flow or communication resources for the device 1005 to use to receive multicast packets of the multicast service session from a content provider via a tunnel between a first network node and the base station, the tunnel established for the multicast service session in response to the transmitted request from the device 1005 based on identifying that the multicast service session lacks an existing tunnel between the first network node and the base station the tunnel, receive information for the at least one multicast quality of service flow, the multicast packets carrying downlink data from the base station according to the indicated communication resources and the identified DRX cycle, and identify a DRX cycle for the multicast service session.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may additionally or alternatively include a modem to modulate the packets and provide the modulated packets to the antennas for transmission, and to demodulate packets received from the antennas. In some cases, the device 1005 may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multicast idle mode behavior and paging). The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
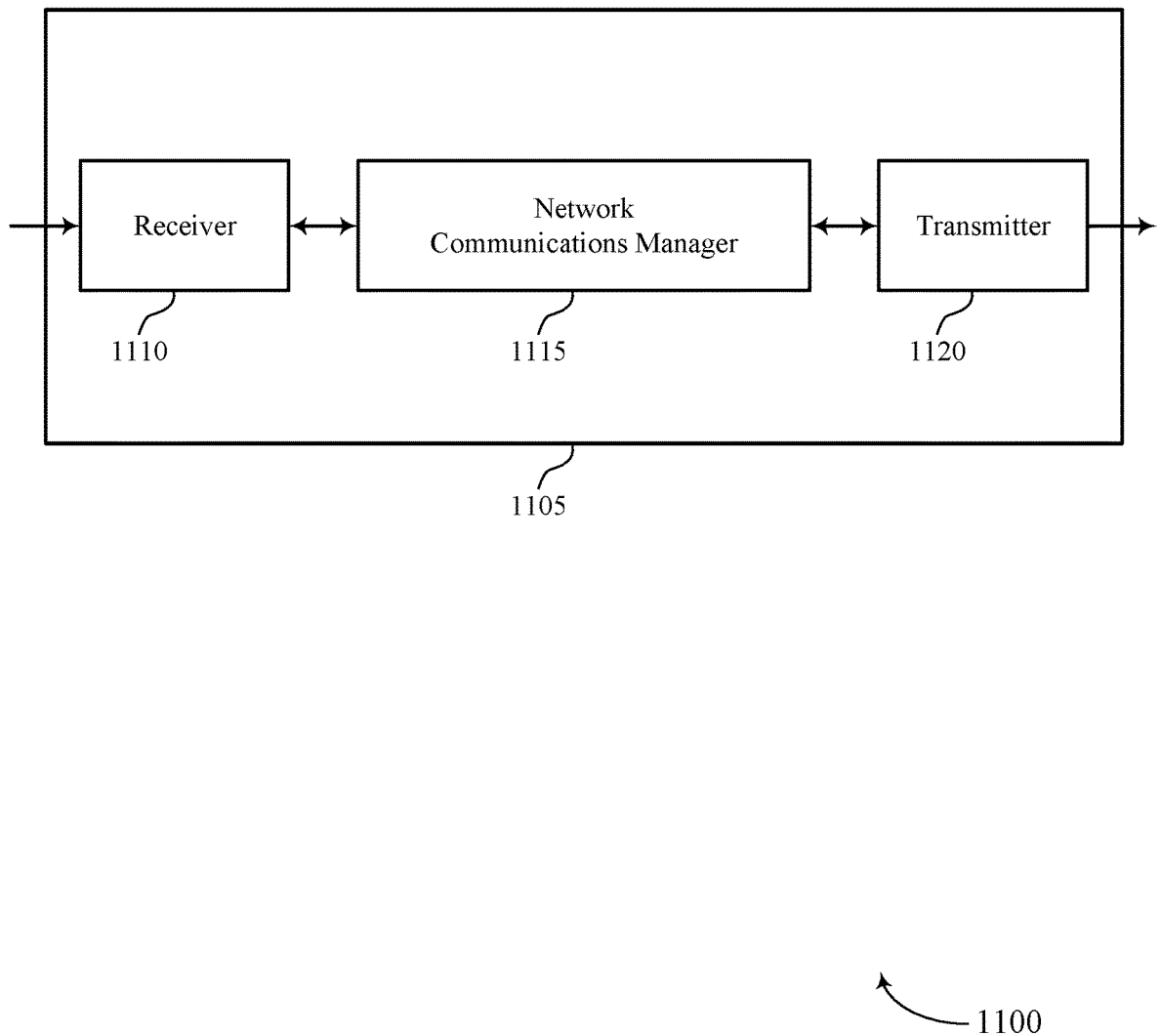
FIGS. 11 and 12 show block diagrams of devices that support multicast idle mode behavior and paging in accordance with aspects of the present disclosure.

FIG. 11 shows a block diagram 1100 of a device 1105 that supports multicast idle mode behavior and paging in accordance with aspects of the present disclosure. The device 1105 may be an example of aspects of a network entity as described herein. The device 1105 may include a receiver 1110, a network communications manager 1115, and a transmitter 1120. The device 1105 may additionally or alternatively include a processor. Each of these components may be in communication with one another (e.g., via one or more buses).

The receiver 1110 may receive information such as packets, user data, or control information associated with various information channels (e.g., control channels, data channels, and information related to multicast idle mode behavior and paging, etc.). Information may be passed on to other components of the device 1105. The receiver 1110 may be an example of aspects of the transceiver 1420 described with reference to FIG. 14. The receiver 1110 may utilize a single antenna or a set of antennas.

The network communications manager 1115 may receive a request to establish a multicast session for a UE via a base station wirelessly communicating with the UE, the request identifying a multicast service session including at least one multicast quality of service flow, identify that the multicast service session lacks a tunnel from a second network node to the base station to transport multicast packets of the multicast service session from a content provider to the UE via the tunnel, and establish the tunnel between the second network node and the base station in response to the received request from the UE. The network communications manager 1115 may be an example of aspects of the network communications manager 1415 described herein.

The network communications manager 1115, or its sub-components, may be implemented in hardware, code (e.g., software or firmware) executed by a processor, or any combination thereof. If implemented in code executed by a processor, the functions of the network communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The network communications manager 1115, or its sub-components, may be physically located at various positions, including being distributed such that portions of functions are implemented at different physical locations by one or more physical components. In some examples, the network communications manager 1115, or its sub-components, may be a separate and distinct component in accordance with various aspects of the present disclosure. In some examples, the network communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
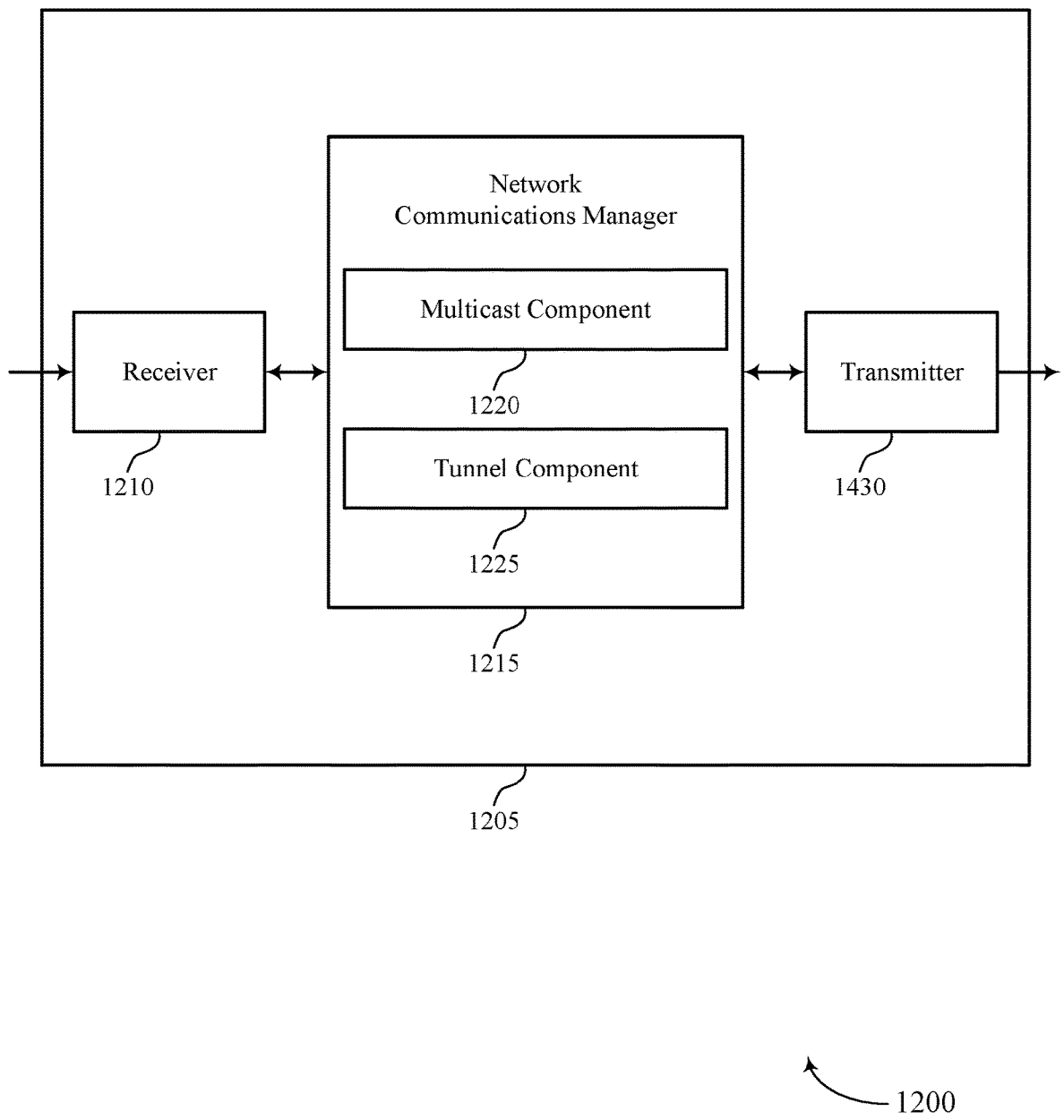

FIG. 12 shows a block diagram 1200 of a device 1205 that supports multicast idle mode behavior and paging in accordance with aspects of the present disclosure. The device 1205 may be an example of aspects of a device 1105 or a network entity (e.g., M-SMF, AMF, M-UPF, RAN, etc.) as described herein. The device 1205 may include a receiver 1210, a network communications manager 1215, and a transmitter 1230. The device 1205 may additionally or alternatively include a processor. Each of these components may be in communication with one another (e.g., via one or more buses).

The receiver 1210 may receive information such as packets, user data, or control information associated with various information channels (e.g., control channels, data channels, and information related to multicast idle mode behavior and paging, etc.). Information may be passed on to other components of the device 1205. The receiver 1210 may be an example of aspects of the transceiver 1420 described with reference to FIG. 14. The receiver 1210 may utilize a single antenna or a set of antennas.

The receiver 1210 may receive a request to establish a multicast session for a UE via a base station wirelessly communicating with the UE, the request identifying a multicast service session including at least one multicast quality of service flow. In some examples, the receiver 1210 may receive an indicator of a handover of the UE from the base station wirelessly communicating with the UE to a target base station.

The network communications manager 1215 may be an example of aspects of the network communications manager 1115 as described herein. The network communications manager 1215 may include a multicast component 1220 and a tunnel component 1225. The network communications manager 1215 may be an example of aspects of the network communications manager 1415 described herein.

The multicast component 1220 may identify that the multicast service session lacks a tunnel from a second network node to the base station to transport multicast packets of the multicast service session from a content provider to the UE via the tunnel. The tunnel component 1225 may establish the tunnel between the second network node and the base station in response to the received request from the UE.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas. The transmitter 1230 may transmit, from the device 1105 (first network node) to the second network node, a request for the second network node to set up the tunnel between the second network node and the base station.

Figure 13:
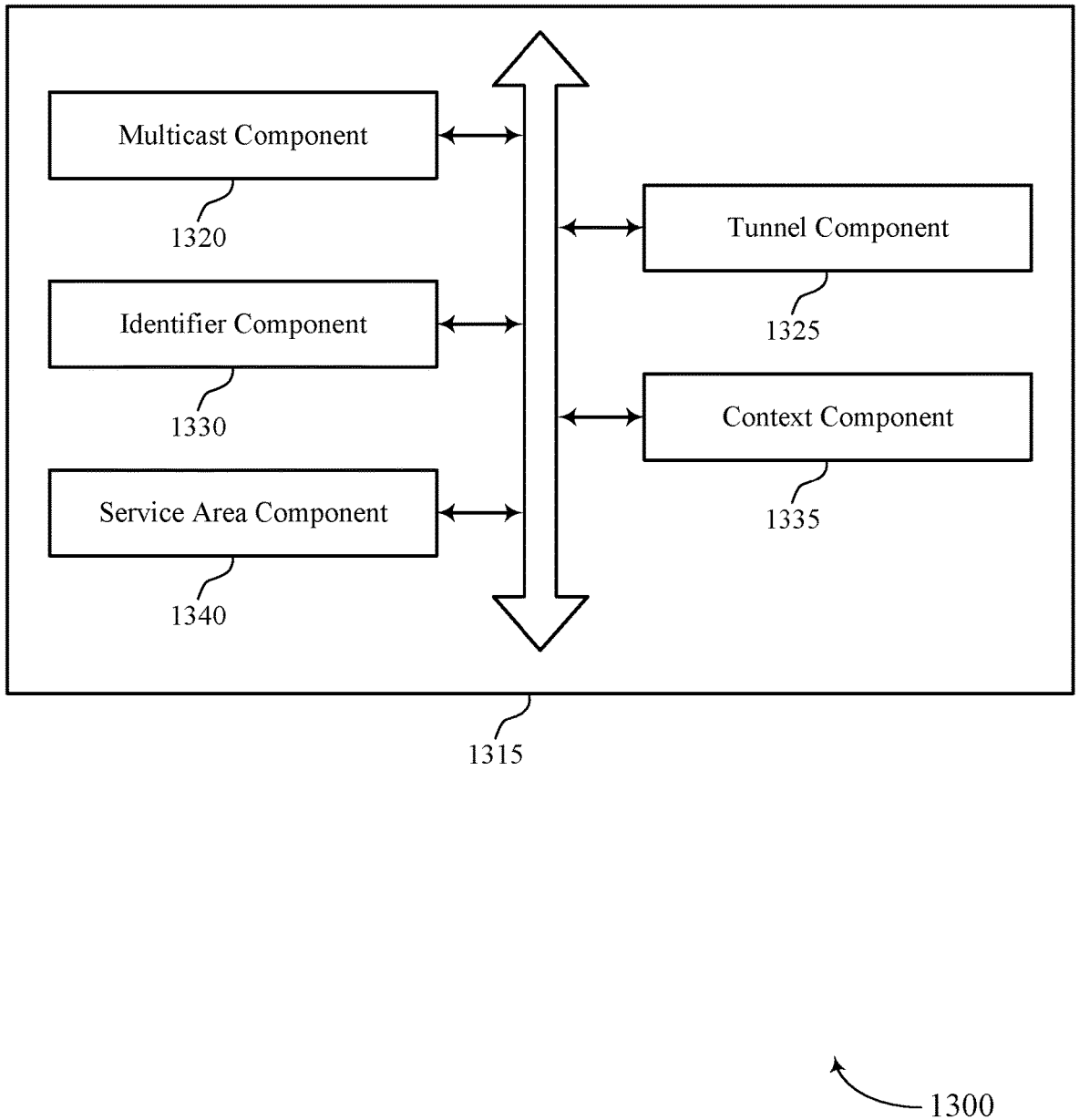
FIG. 13 shows a block diagram of a network communications manager that supports multicast idle mode behavior and paging in accordance with aspects of the present disclosure.

FIG. 13 shows a block diagram 1300 of a network communications manager 1315 that supports multicast idle mode behavior and paging in accordance with aspects of the present disclosure. The network communications manager 1315 may be an example of aspects of a network communications manager 1115, a network communications manager 1215, or a network communications manager 1415 described herein. The network communications manager 1315 may include a multicast component 1320, a tunnel component 1325, an identifier component 1330, a context component 1335, and a service area component 1340. Each of these modules may communicate, directly or indirectly, with one another (e.g., via one or more buses).

The multicast component 1320 may identify that a multicast service session lacks a tunnel from a second network node to a base station to transport multicast packets of a multicast service session from a content provider to a UE via the tunnel. The tunnel component 1325 may establish the tunnel between the second network node and the base station in response to a received request from the UE.

The identifier component 1330 may generate an identifier for the multicast service session, where the request identifying the multicast service session includes the identifier generated by a first network node. Additionally or alternatively the request identifying the multicast service session includes a quality of service flow identifier. In some examples, the quality of service flow identifier is unique within a service area. In some examples, the identifier component 1330 may combine an M-SMF identifier for the first network node and a multicast stream identifier generated by the M-SMF to generate the identifier for the multicast service session.

The context component 1335 may modify a context of the multicast session for the UE in response to the received indicator. The service area component 1340 may identify that the target base station is outside a multicast service area for the multicast service session, where modifying the context includes rejecting a request to enroll the UE in the multicast session and tearing down the multicast session for the UE. In some examples, identifying that the target base station is inside a multicast service area for the multicast service session, where modifying the context includes enrolling the UE in the multicast session.

Figure 14:
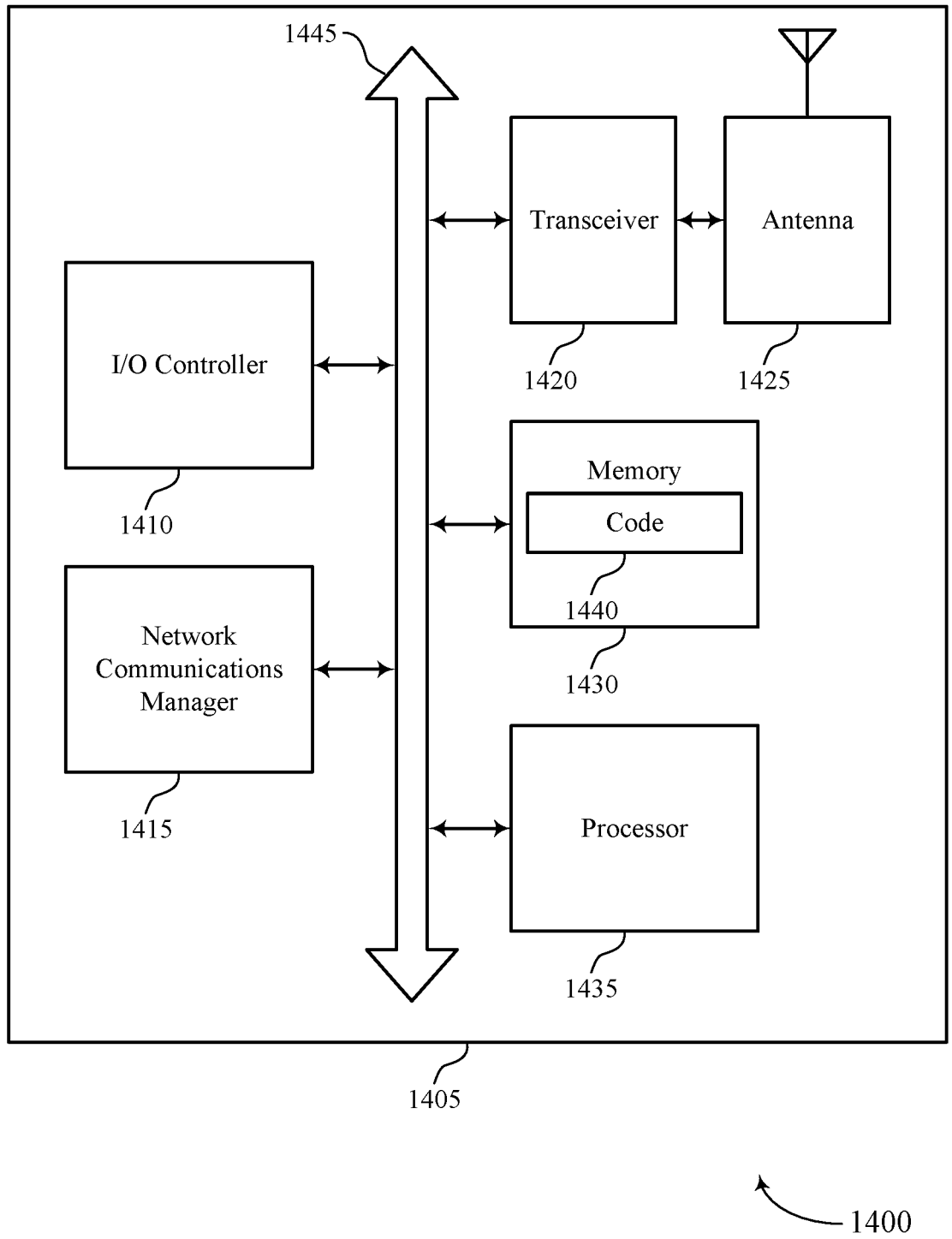
FIG. 14 shows a diagram of a system including a device that supports multicast idle mode behavior and paging in accordance with aspects of the present disclosure.

FIG. 14 shows a diagram of a system 1400 including a device 1405 that supports multicast idle mode behavior and paging in accordance with aspects of the present disclosure. The device 1405 may be an example of or include the components of device 1105, device 1205, or a network entity as described herein. The device 1405 may include components for bi-directional voice and data communications including components for transmitting and receiving communications, including an I/O controller 1410, a network communications manager 1415, a transceiver 1420, an antenna 1425, memory 1430, and a processor 1435. These components may be coupled via one or more buses (e.g., bus 1445).

The I/O controller 1410 may manage input and output signals for the device 1405. The I/O controller 1410 may additionally or alternatively manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. In other cases, the I/O controller 1410 may represent or interact with a modem, a keyboard, a mouse, a touchscreen, or a similar device. In some cases, the I/O controller 1410 may be implemented as part of a processor. In some cases, a user may interact with the device 1405 via the I/O controller 1410 or via hardware components controlled by the I/O controller 1410.

The network communications manager 1415 may receive a request to establish a multicast session for a UE via a base station wirelessly communicating with the UE, the request identifying a multicast service session including at least one multicast quality of service flow, identify that the multicast service session lacks a tunnel from a second network node to the base station to transport multicast packets of the multicast service session from a content provider to the UE via the tunnel, and establish the tunnel between the second network node and the base station in response to the received request from the UE.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may additionally or alternatively include a modem to modulate the packets and provide the modulated packets to the antennas for transmission, and to demodulate packets received from the antennas. In some cases, the device 1405 may include a single antenna 1425. However, in some cases the device 1405 may have more than one antenna 1425, which may be capable of concurrently transmitting or receiving multiple wireless transmissions.

The memory 1430 may include RAM and ROM. The memory 1430 may store computer-readable, computer-executable code 1440 including instructions that, when executed, cause the processor to perform various functions described herein. In some cases, the memory 1430 may contain, among other things, a BIOS which may control basic hardware or software operation such as the interaction with peripheral components or devices.

The processor 1435 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1435 may be configured to operate a memory array using a memory controller. In other cases, a memory controller may be integrated into the processor 1435. The processor 1435 may be configured to execute computer-readable instructions stored in a memory (e.g., the memory 1430) to cause the device 1405 to perform various functions (e.g., functions or tasks supporting multicast idle mode behavior and paging). The code 1440 may include instructions to implement aspects of the present disclosure, including instructions to support wireless communications. The code 1440 may be stored in a non-transitory computer-readable medium such as system memory or other type of memory. In some cases, the code 1440 may not be directly executable by the processor 1435 but may cause a computer (e.g., when compiled and executed) to perform functions described herein.

Figure 15:
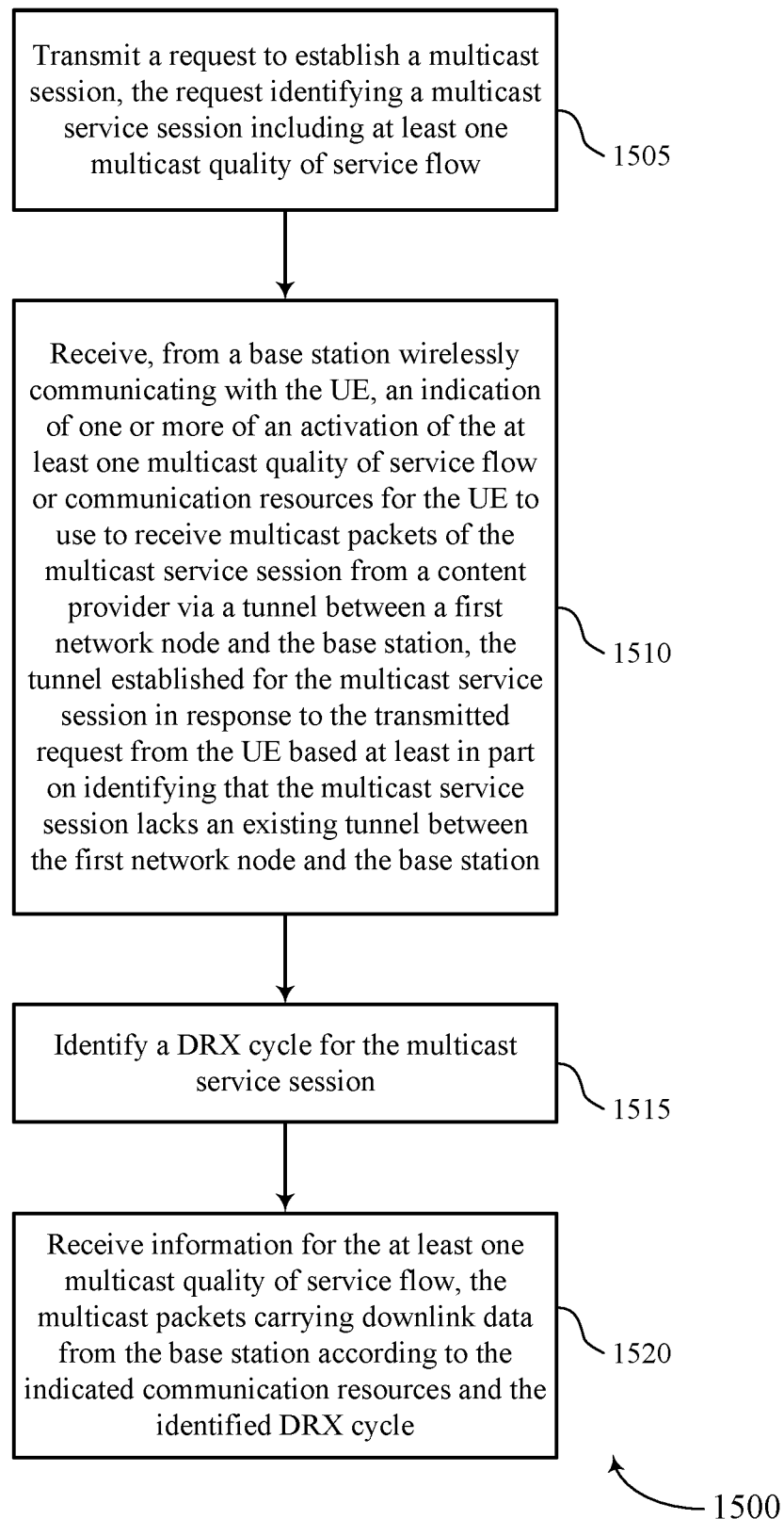
FIGS. 15 through 19 show flowcharts illustrating methods that support multicast idle mode behavior and paging in accordance with aspects of the present disclosure.

FIG. 15 shows a flowchart illustrating a method 1500 that supports multicast idle mode behavior and paging in accordance with aspects of the present disclosure. The operations of method 1500 may be implemented by a UE 115 or its components as described herein. For example, the operations of method 1500 may be performed by a UE communications manager as described with reference to FIGS. 8 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit a request to establish a multicast session, the request identifying a multicast service session including at least one multicast quality of service flow. The operations of 1505 may be performed according to the methods described herein. In some examples, aspects of the operations of 1505 may be performed by a transmitter as described with reference to FIGS. 8 through 10.

At 1510, the UE may receive, from a base station wirelessly communicating with the UE, an indication of one or more of an activation of the at least one multicast quality of service flow or communication resources for the UE to use to receive multicast packets of the multicast service session from a content provider via a tunnel between a first network node and the base station, the tunnel established for the multicast service session in response to the transmitted request from the UE based on identifying that the multicast service session lacks an existing tunnel between the first network node and the base station. The operations of 1510 may be performed according to the methods described herein. In some examples, aspects of the operations of 1510 may be performed by a receiver as described with reference to FIGS. 8 through 10.

At 1515, the UE may identify a DRX cycle for the multicast service session. The operations of 1515 may be performed according to the methods described herein. In some examples, aspects of the operations of 1515 may be performed by a multicast component as described with reference to FIGS. 8 through 10.

At 1520, the UE may receive information for the at least one multicast quality of service flow, the multicast packets carrying downlink data from the base station according to the indicated communication resources and the identified DRX cycle. The operations of 1520 may be performed according to the methods described herein. In some examples, aspects of the operations of 1520 may be performed by a receiver as described with reference to FIGS. 8 through 10.

Figure 16:
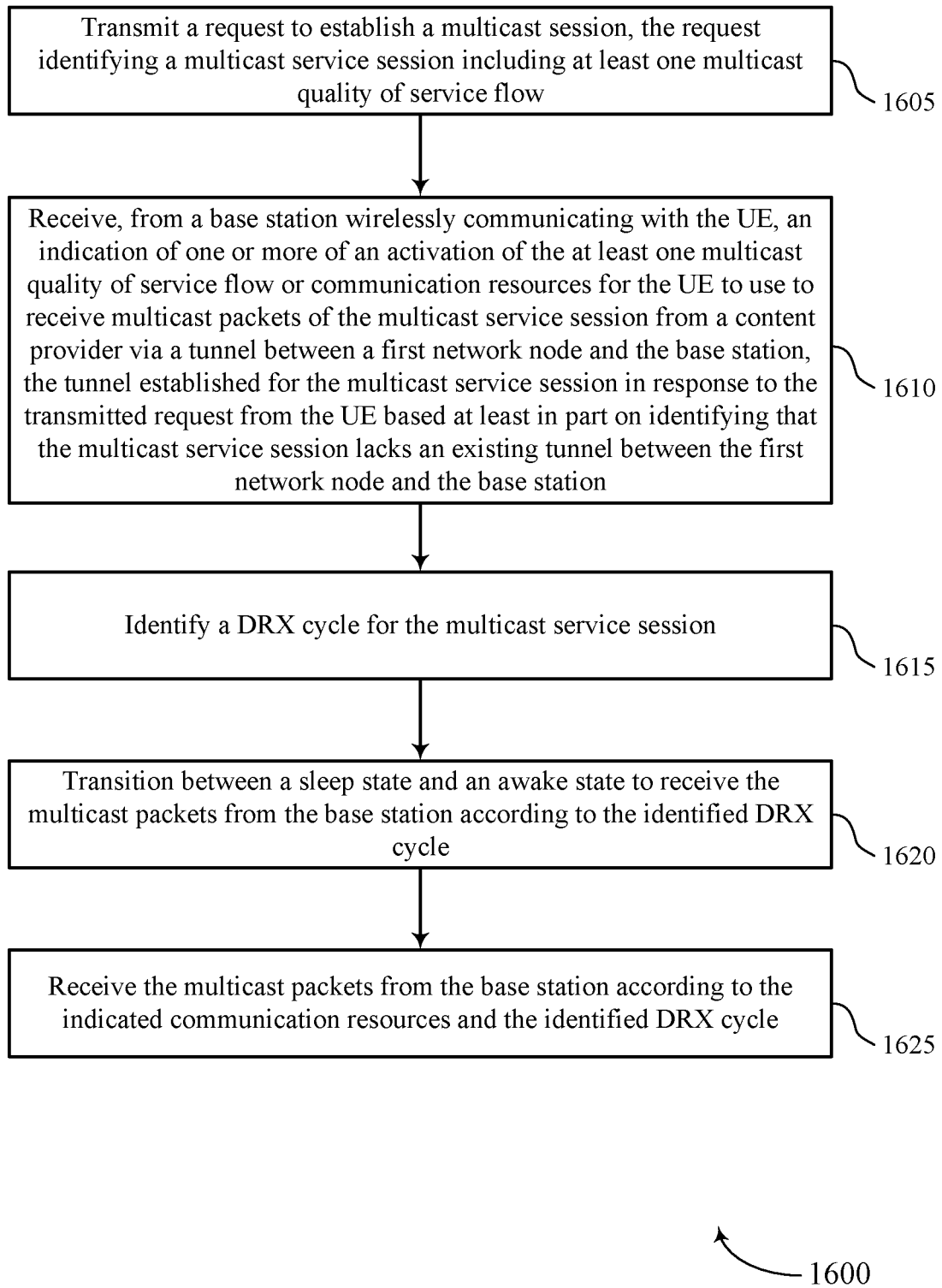

FIG. 16 shows a flowchart illustrating a method 1600 that supports multicast idle mode behavior and paging in accordance with aspects of the present disclosure. The operations of method 1600 may be implemented by a UE 115 or its components as described herein. For example, the operations of method 1600 may be performed by a UE communications manager as described with reference to FIGS. 8 through 10. In some examples, a UE may execute a set of instructions to control the functional elements of the UE to perform the functions described below. Additionally or alternatively, a UE may perform aspects of the functions described below using special-purpose hardware.

At 1605, the UE may transmit a request to establish a multicast session, the request identifying a multicast service session including at least one multicast quality of service flow. The operations of 1605 may be performed according to the methods described herein. In some examples, aspects of the operations of 1605 may be performed by a transmitter as described with reference to FIGS. 8 through 10.

At 1610, the UE may receive, from a base station wirelessly communicating with the UE, an indication of one or more of an activation of the at least one multicast quality of service flow or communication resources for the UE to use to receive multicast packets of the multicast service session from a content provider via a tunnel between a first network node and the base station, the tunnel established for the multicast service session in response to the transmitted request from the UE based on identifying that the multicast service session lacks an existing tunnel between the first network node and the base station. The operations of 1610 may be performed according to the methods described herein. In some examples, aspects of the operations of 1610 may be performed by a receiver as described with reference to FIGS. 8 through 10.

At 1615, the UE may identify a DRX cycle for the multicast service session. The operations of 1615 may be performed according to the methods described herein. In some examples, aspects of the operations of 1615 may be performed by a multicast component as described with reference to FIGS. 8 through 10.

At 1620, the UE may transition between a sleep state and an awake state to receive information for the at least one multicast quality of service flow, the multicast packets carrying downlink data from the base station according to the identified DRX cycle. The operations of 1620 may be performed according to the methods described herein. In some examples, aspects of the operations of 1620 may be performed by a state component as described with reference to FIGS. 8 through 10.

At 1625, the UE may receive information for the at least one multicast quality of service flow, the multicast packets carrying downlink data from the base station according to the indicated communication resources and the identified DRX cycle. The operations of 1625 may be performed according to the methods described herein. In some examples, aspects of the operations of 1625 may be performed by a receiver as described with reference to FIGS. 8 through 10.

Figure 17:
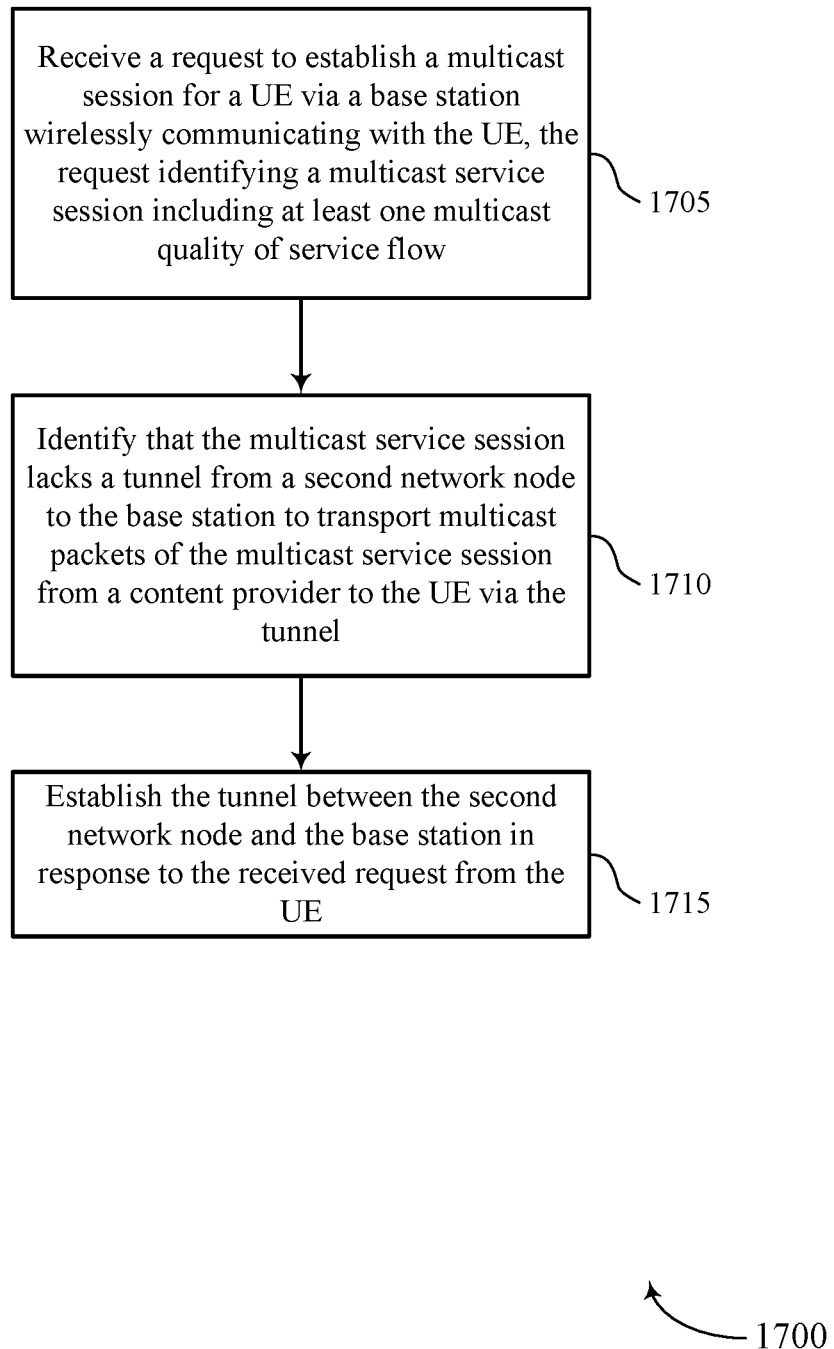

FIG. 17 shows a flowchart illustrating a method 1700 that supports multicast idle mode behavior and paging in accordance with aspects of the present disclosure. The operations of method 1700 may be implemented by a network entity or its components as described herein. For example, the operations of method 1700 may be performed by a network communications manager as described with reference to FIGS. 11 through 14. In some examples, a network entity may execute a set of instructions to control the functional elements of the network entity to perform the functions described below. Additionally or alternatively, a network entity may perform aspects of the functions described below using special-purpose hardware.

At 1705, the network entity may receive a request to establish a multicast session for a UE via a base station wirelessly communicating with the UE, the request identifying a multicast service session including at least one multicast quality of service flow. The operations of 1705 may be performed according to the methods described herein. In some examples, aspects of the operations of 1705 may be performed by a receiver as described with reference to FIGS. 11 through 14.

At 1710, the network entity may identify that the multicast service session lacks a tunnel from a second network node to the base station to transport multicast packets of the multicast service session from a content provider to the UE via the tunnel. In some examples, the network entity may be a first network node. The operations of 1710 may be performed according to the methods described herein. In some examples, aspects of the operations of 1710 may be performed by a multicast component as described with reference to FIGS. 11 through 14.

At 1715, the network entity may establish the tunnel between the second network node and the base station in response to the received request from the UE. The operations of 1715 may be performed according to the methods described herein. In some examples, aspects of the operations of 1715 may be performed by a tunnel component as described with reference to FIGS. 11 through 14.

Figure 18:
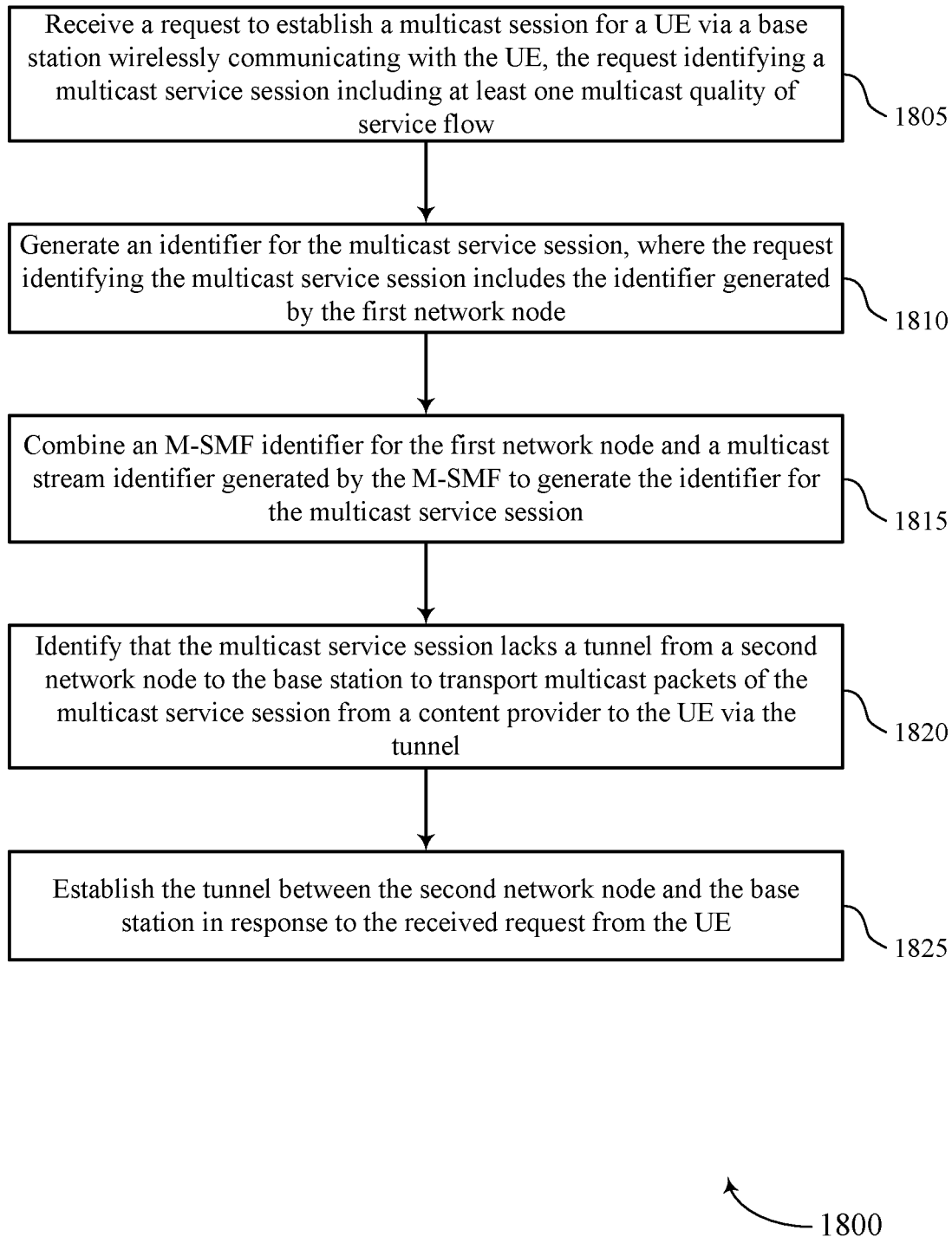

FIG. 18 shows a flowchart illustrating a method 1800 that supports multicast idle mode behavior and paging in accordance with aspects of the present disclosure. The operations of method 1800 may be implemented by a network entity or its components as described herein. For example, the operations of method 1800 may be performed by a network communications manager as described with reference to FIGS. 11 through 14. In some examples, a network entity may execute a set of instructions to control the functional elements of the network entity to perform the functions described below. Additionally or alternatively, a network entity may perform aspects of the functions described below using special-purpose hardware.

At 1805, the network entity may receive a request to establish a multicast session for a UE via a base station wirelessly communicating with the UE, the request identifying a multicast service session including at least one multicast quality of service flow. The operations of 1805 may be performed according to the methods described herein. In some examples, aspects of the operations of 1805 may be performed by a receiver as described with reference to FIGS. 11 through 14.

At 1810, the network entity may generate an identifier for the multicast service session, where the request identifying the multicast service session includes the identifier generated by the first network node. Additionally or alternatively the request identifying the multicast service session includes a quality of service flow identifier. In some examples, the quality of service flow identifier is unique within a service area. The operations of 1810 may be performed according to the methods described herein. In some examples, aspects of the operations of 1810 may be performed by an identifier component as described with reference to FIGS. 11 through 14.

At 1815, the network entity may combine a multicast session management function (M-SMF) identifier for the first network node and a multicast stream identifier generated by the M-SMF to generate the identifier for the multicast service session. The operations of 1815 may be performed according to the methods described herein. In some examples, aspects of the operations of 1815 may be performed by an identifier component as described with reference to FIGS. 11 through 14.

At 1820, the network entity may identify that the multicast service session lacks a tunnel from a second network node to the base station to transport multicast packets of the multicast service session from a content provider to the UE via the tunnel. The operations of 1820 may be performed according to the methods described herein. In some examples, aspects of the operations of 1820 may be performed by a multicast component as described with reference to FIGS. 11 through 14.

At 1825, the network entity may establish the tunnel between the second network node and the base station in response to the received request from the UE. The operations of 1825 may be performed according to the methods described herein. In some examples, aspects of the operations of 1825 may be performed by a tunnel component as described with reference to FIGS. 11 through 14.

Figure 19:
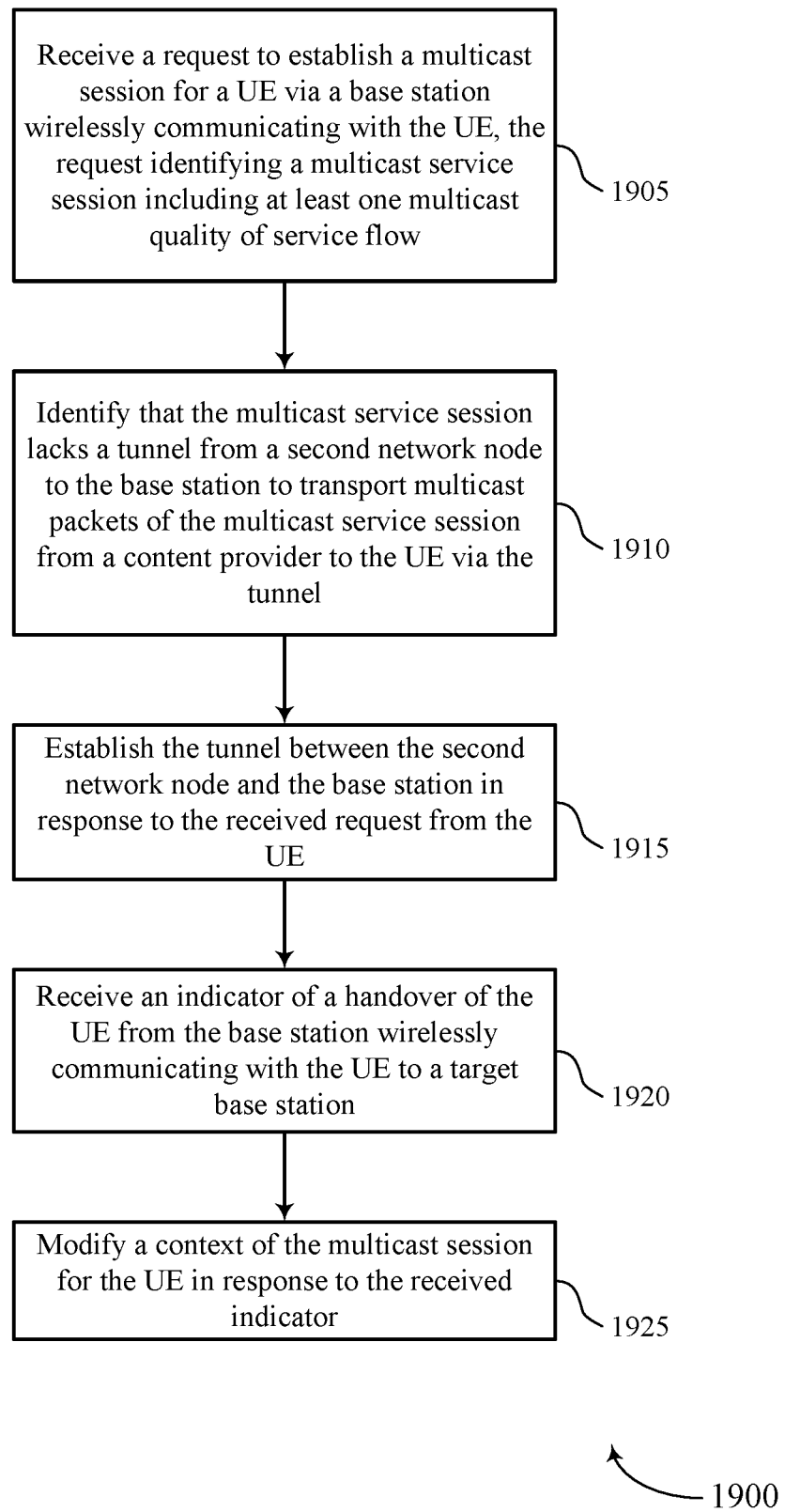

FIG. 19 shows a flowchart illustrating a method 1900 that supports multicast idle mode behavior and paging in accordance with aspects of the present disclosure. The operations of method 1900 may be implemented by a network entity or its components as described herein. For example, the operations of method 1900 may be performed by a network communications manager as described with reference to FIGS. 11 through 14. In some examples, a network entity may execute a set of instructions to control the functional elements of the network entity to perform the functions described below. Additionally or alternatively, a network entity may perform aspects of the functions described below using special-purpose hardware.

At 1905, the network entity may receive a request to establish a multicast session for a UE via a base station wirelessly communicating with the UE, the request identifying a multicast service session including at least one multicast quality of service flow. The operations of 1905 may be performed according to the methods described herein. In some examples, aspects of the operations of 1905 may be performed by a receiver as described with reference to FIGS. 11 through 14.

At 1910, the network entity may identify that the multicast service session lacks a tunnel from a second network node to the base station to transport multicast packets of the multicast service session from a content provider to the UE via the tunnel. In some examples, the network entity may be a first network node. The operations of 1910 may be performed according to the methods described herein. In some examples, aspects of the operations of 1910 may be performed by a multicast component as described with reference to FIGS. 11 through 14.

At 1915, the network entity may establish the tunnel between the second network node and the base station in response to the received request from the UE. The operations of 1915 may be performed according to the methods described herein. In some examples, aspects of the operations of 1915 may be performed by a tunnel component as described with reference to FIGS. 11 through 14.

At 1920, the network entity may receive an indicator of a handover of the UE from the base station wirelessly communicating with the UE to a target base station. The operations of 1920 may be performed according to the methods described herein. In some examples, aspects of the operations of 1920 may be performed by a receiver as described with reference to FIGS. 11 through 14.

At 1925, the network entity may modify a context of the multicast session for the UE in response to the received indicator. The operations of 1925 may be performed according to the methods described herein. In some examples, aspects of the operations of 1925 may be performed by a context component as described with reference to FIGS. 11 through 14.

It should be noted that the methods described herein describe possible examples, and that the operations and the steps may be rearranged or otherwise modified and that other examples are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may additionally or alternatively support communications using one or multiple component carriers.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples are within the scope of the disclosure and appended claims. For example, due to the nature of software, functions described herein can be implemented using software executed by a processor, hardware, firmware, hardwiring, or combinations of any of these. Features implementing functions may additionally or alternatively be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting a request identifying a multicast service session, wherein the multicaset service session comprises a plurality of multicast quality of service flows;
    receiving, from a base station wirelessly communicating with the UE, an indication of communication resources for the UE to use to receive multicast packets for the plurality of multicast quality of service flows of the multicast service session from a content provider via a tunnel between a first network node and the base station;
    identifying a discontinuous reception (DRX) cycle for the multicast service session; and
    receiving, via the multicast service session, the multicast packets for the plurality of multicast quality of service flows, the multicast packets carrying downlink data according to the indicated communication resources and the identified DRX cycle for the multicast service session.

2. The method of claim 1, wherein the request identifying the multicast service session comprises a quality of service flow identifier.

3. The method of claim 2, wherein the quality of service flow identifier is unique within a service area comprising one or more tracking areas associated with the UE.

4. The method of claim 1, wherein the first network node comprises a multicast user plane function (M-UPF).

5. The method of claim 1, further comprising: transitioning between asleep state and an awake state based at least in part on being paged to receive, via the multicast service session comprising the plurality of multicast quality of service flows, the multicast packets according to the identified DRX cycle for the multicast service session.

6. The method of claim 5, further comprising: transitioning between the sleep state and the awake state based at least in part on being paged according to a second DRX cycle for the UE to receive, via a second multicast service session comprising a second plurality of multicast quality of service flows, multicast packets of the second multicast service session.

7. The method of claim 5, further comprising: transitioning between the sleep state and the awake state based at least in part on being paged according to a second DRX cycle for the UE to receive unicast transmissions.

8. The method of claim 1, wherein the request identifying the multicast service session comprises a multicast packet data unit (M-PDU) session identifier.

9. The method of claim 8, wherein the M-PDU session identifier comprises a combination of a multicast session management function (M-SMF) identifier and a multicast stream identifier generated by a M-SMF.

10. The method of claim 1, wherein a quality of service flow identifier is unique to a public land mobile network (PLMN) associated with the base station.

11. The method of claim 10, further comprising: receiving the quality of service flow identifier from a second network node, wherein the quality of service flow identifier is generated by the second network node.

12. The method of claim 1, wherein the request identifying the multicast service session comprises a data network name (DNN) or the request identifying the multicast service session comprises network slice information.

13. The method of claim 1, wherein the multicast service session comprises one tunnel between the first network node and the base station.

14. The method of claim 1, wherein authorization associated with the multicast service session comprising the plurality of multicast quality of service flows is based at least in part on transmitting the request, and wherein receiving the multicast packets via the multicast service session is based at least in part on the authorization.

15. The method of claim 14, further comprising: exchanging an establishment accept message associated with the multicast service session comprising the plurality of multicast quality of service flows based at least in part on the authorization.

16. The method of claim 1, further comprising: transmitting the request to join the multicast service session via a session management function (SMF).

17. The method of claim 1, wherein the tunnel is established for the multicast service session based at least in part on the multicast service session lacking an existing tunnel between the first network node and the base station.

18. An apparatus for wireless communications, comprising:
    one or more processors, memory coupled with the one or more processors; and
    instructions stored in the memory and executable by the one or more processors to cause the apparatus to:
        transmit a request identifying a multicast service session, wherein the multicast service session comprises a plurality of multicast quality of service flows;
        receive, from a base station wirelessly communicating with the apparatus, an indication of communication resources for the apparatus to use to receive multicast packets for the plurality of multicast quality of service flows of the multicast service session from a content provider via a tunnel between a first network node and the base station;
        identify a discontinuous reception (DRX) cycle for the multicast service session; and
        receive, via the multicast service session, the multicast packets for the plurality of multicast quality of service flows, the multicast packets carrying downlink data according to the indicated communication resources and the identified DRX cycle for the multicast service session.

19. The apparatus of claim 18, wherein the request identifying the multicast service session comprises a quality of service flow identifier.

20. The apparatus of claim 19, wherein the quality of service flow identifier is unique within a service area comprising one or more tracking areas associated with the apparatus.

21. The apparatus of claim 18, wherein the first network node comprises a multicast user plane function (M-UPF).

22. The apparatus of claim 18, wherein the one or more processors are configured to cause the apparatus to: transition between asleep state and an awake state based at least in part on being paged to receive, via the multicast service session comprising the plurality of multicast quality of service flows, the multicast packets according to the identified DRX cycle for the multicast service session.

23. The apparatus of claim 22, wherein the one or more processors are configured to cause the apparatus to: transition between the sleep state and the awake state based at least in part on being paged according to a second DRX cycle for the apparatus to receive, via a second multicast service session comprising a second plurality of multicast quality of service flows, multicast packets of the second multicast service session.

24. The apparatus of claim 22, wherein the one or more processors are configured to cause the apparatus to: transition between the sleep state and the awake state based at least in part on being paged according to a second DRX cycle for the apparatus to receive unicast transmissions.

25. The apparatus of claim 18, wherein the request identifying the multicast service session comprises a multicast packet data unit (M-PDU) session identifier.

26. The apparatus of claim 25, wherein the M-PDU session identifier comprises a combination of a multicast session management function (M-SMF) identifier and a multicast stream identifier generated by a M-SMF.

27. The apparatus of claim 18, wherein a quality of service flow identifier is unique to a public land mobile network (PLMN) associated with the base station.

28. The apparatus of claim 27, wherein the one or more processors are configured to cause the apparatus to: receive the quality of service flow identifier from a second network node, wherein the quality of service flow identifier is generated by the second network node.

29. The apparatus of claim 18, wherein the request identifying the multicast service session comprises a data network name (DNN) or the request identifying the multicast service session comprises network slice information.

30. The apparatus of claim 18, wherein authorization associated with the multicast service session comprising the plurality of multicast quality of service flows is based at least in part on the request, and wherein the one or more processors are configured to cause the apparatus to receive the multicast packets via the multicast service session based at least in part on the authorization.

31. The apparatus of claim 30, wherein the one or more processors are configured to cause the apparatus to: exchange an establishment accept message associated with the multicast service session comprising the plurality of multicast quality of service flows based at least in part on the authorization.

32. The apparatus of claim 18, wherein the tunnel is established for the multicast service session based at least in part on the multicast service session lacking an existing tunnel between the first network node and the base station.

* * * * *